(12) United States Patent
Liu et al.

(10) Patent No.: US 12,526,015 B2
(45) Date of Patent: Jan. 13, 2026

(54) CODEBOOK INDICATION METHOD AND APPARATUS, AND STORAGE MEDIUM

(71) Applicant: DATANG MOBILE COMMUNICATIONS EQUIPMENT CO., LTD., Beijing (CN)

(72) Inventors: Zhengxuan Liu, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 34 days.

(21) Appl. No.: 18/560,369

(22) PCT Filed: Mar. 29, 2022

(86) PCT No.: PCT/CN2022/083724
§ 371 (c)(1),
(2) Date: Nov. 10, 2023

(87) PCT Pub. No.: WO2022/237360
PCT Pub. Date: Nov. 17, 2022

(65) Prior Publication Data
US 2024/0243786 A1 Jul. 18, 2024

(30) Foreign Application Priority Data
May 11, 2021 (CN) .......................... 202110513720.8

(51) Int. Cl.
*H04B 7/0456* (2017.01)
*H04B 7/06* (2006.01)
*H04B 7/10* (2017.01)

(52) U.S. Cl.
CPC ......... *H04B 7/0469* (2013.01); *H04B 7/0478* (2013.01); *H04B 7/0634* (2013.01);
(Continued)

(58) Field of Classification Search
CPC .......... H04B 7/06; H04B 7/10; H04B 7/0417; H04B 7/0456; H04B 7/0478;
(Continued)

(56) References Cited

U.S. PATENT DOCUMENTS 11,277,187 B2 * 3/2022 Rahman ................ H04W 76/27
11,381,293 B2 * 7/2022 Rahman ................ H04B 7/0478
(Continued)

FOREIGN PATENT DOCUMENTS

CN 109495149 A 3/2019
CN 109983712 A 7/2019
(Continued)

OTHER PUBLICATIONS

Japanese Patent Office, Office Action Issued in Application No. 2023-570112, Dec. 3, 2024, 5 pages.
(Continued)

*Primary Examiner* — Shawkat M Ali
(74) *Attorney, Agent, or Firm* — KILPATRICK TOWNSEND & STOCKTON LLP

(57) ABSTRACT

Embodiments of the present disclosure provide a codebook indication method and apparatus, and a storage medium. The method comprises: sending codebook indication information to a network side device, the codebook indication information including at least one of the following information of at least one transmission layer: port selection indication information, strongest coefficient indication information, or frequency domain base vector indication information. In the embodiments of the present disclosure, by indicating at least one of the port selection of at least one transmission layer, the strongest coefficient of a combined coefficient matrix, and the frequency domain basis vector, the feedback overhead of indication of some ports, the feedback overhead of the strongest coefficient indication,
(Continued)

START

Transmitting codebook indication information to a network-side device, where the codebook indication information includes at least one of following information of at least one transmission layer: port selection indication information; strongest coefficient indication information; or frequency domain basis vector indication information

100 and the overhead of the frequency domain base vector indication can be reduced, compared with the traditional independent indication of each layer.

12 Claims, 2 Drawing Sheets

(52) U.S. Cl.
CPC ......... *H04B 7/0639* (2013.01); *H04B 7/0658* (2013.01); *H04B 7/10* (2013.01)

(58) Field of Classification Search
CPC .............. H04B 7/0634; H04B 7/0639; H04B 7/0658; H04L 5/00; H04W 24/08; H04W 24/10; H04W 72/00; H04W 72/04; H04W 76/27; H04W 80/08
USPC ............. 375/219, 260, 262, 267, 295, 316
See application file for complete search history.

(56) References Cited

U.S. PATENT DOCUMENTS

| | | |
|---|---|---|
| 2018/0145737 A1 | 5/2018 | Rahman et al. |
| 2020/0343956 A1 | 10/2020 | Rahman et al. |
| 2021/0044340 A1 | 2/2021 | Rahman et al. |
| 2021/0075482 A1 | 3/2021 | Rahman et al. |

FOREIGN PATENT DOCUMENTS

| | | |
|---|---|---|
| CN | 111756415 A | 10/2020 |
| CN | 111800172 A | 10/2020 |
| CN | 112187324 A | 1/2021 |
| JP | 2022543477 A | 10/2022 |
| WO | 2020186871 A1 | 9/2020 |
| WO | 2020207254 A1 | 10/2020 |
| WO | 2020218821 A1 | 10/2020 |
| WO | 2020223839 A1 | 11/2020 |
| WO | 2021025538 A1 | 2/2021 |
| WO | 2022036720 A1 | 2/2022 |

OTHER PUBLICATIONS

ISA State Intellectual Property Office of the People's Republic of China, International Search Report Issued in Application No. PCT/CN2022/083724, Jun. 21, 2022, WIPO, 6 pages.
Ericsson, "On CSI enhancements for MU-MIMO", 3GPP TSG RAN WG1 Meeting RAN1#97, Reno, US, May 13-17, 2019, total 19 pages, R1-1907074.
LG Electronics, "Discussion on overhead reduction for Type II codebook", 3GPP TSG RAN WG1 #96bis, Xi'an, China, Apr. 8-12, 2019, total 14 pages, R1-1904207.
State Intellectual Property Office of the People's Republic of China, first Office Action Issued in Application No. 202110513720.8, May 31, 2023, 6 pages.
European Patent Office, Extended European Search Report Issued in Application No. 22806330.1, Oct. 16, 2024, Germany, 15 pages.
ZTE, "CSI Enhancement for MU-MIMO Support", 3GPP TSG RAN WG1 Meeting #98, Prague, CZ, Aug. 26-30, 2019, total 16 pages, R1-1908190.
Taiwan Patent Office, First Office Action Issued in Application No. 111107674, Jun. 20, 2022, 6 pages.

\* cited by examiner

CODEBOOK INDICATION METHOD AND APPARATUS, AND STORAGE MEDIUM

CROSS-REFERENCE TO RELATED APPLICATION

The present application is a National Stage of International Application No. PCT/CN2022/083724, filed on Mar. 29, 2022, which claims priority to Chinese patent application No. 202110513720.8 filed on May 11, 2021, entitled "Codebook Indication Method and Apparatus, and Storage Medium", which are hereby incorporated by reference in their entireties.

FIELD

The present application relates to the field of communication, in particular to a codebook indication method and apparatus, and a storage medium.

BACKGROUND

When a network-side device generates a codebook, the network-side device needs information of various parts of a codebook structure. A terminal-side device may report the information to the network-side device, and after receiving the information, the network-side device may generate the codebook based on the information reported from the terminal-side device.

However, for port selection codebook of some communication systems, when rank≥1, the feedback overhead will increase if the information of various parts of the codebook structure is indicated by traditional schemes.

SUMMARY

The embodiments of the present application provide a codebook indication method and apparatus, and a storage medium, by which associated information of a codebook for at least one transmission layer is indicated and both indication overhead and feedback overhead are reduced.

An embodiment of the present application provides a codebook indication method, including:
transmitting codebook indication information to a network-side device, where the codebook indication information includes at least one of following information of at least one transmission layer:
port selection indication information;
strongest coefficient indication information; or
frequency domain basis vector indication information.

According to the codebook indication method in an embodiment of the present application, the port selection indication information includes first information and second information;
if two polarization directions selected by a terminal-side device correspond to same ports, the first information is used to indicate an intersection of ports corresponding to each transmission layer in one polarization direction; and the second information is used to indicate remaining ports other than the intersection among ports corresponding to the each transmission layer in one polarization direction; or,
if two polarization directions selected by a terminal-side device correspond to different ports, the first information is used to indicate an intersection of ports corresponding to each transmission layer in the two polarization directions; and the second information is used to indicate remaining ports other than the intersection among ports corresponding to the each transmission layer in the two polarization directions.

According to the codebook indication method in an embodiment of the present application, the first information is indicated by a combination number with a size of $$\left\lceil \log_2 \binom{P}{K} \right\rceil$$

bits;
if the two polarization directions selected by the terminal-side device correspond to the same ports, P=X/2; if the two polarization directions selected by the terminal-side device correspond to different ports, P=X; X is the number of ports configured by the network-side device for the terminal-side device; K is the number of elements in the intersection.

According to the codebook indication method in an embodiment of the present application, the first information is indicated by a bitmap with a size of P bits.

According to the codebook indication method in an embodiment of the present application, the second information is indicated by a combination number with a size of $$\left\lceil \log_2 \binom{P-K}{K_{l,1}-K} \right\rceil$$

bits:
if the two polarization directions selected by the terminal-side device correspond to the same ports, $$K_{l,1} = \frac{P'_l}{2};$$

if the two polarization directions selected by the terminal-side device correspond to different ports, $K_{l,1}=P'_l$: K is the number of elements in the intersection; $P'_l$ is the number of ports selected by the terminal-side device for l-th transmission layer.

According to the codebook indication method in an embodiment of the present application, the second information is indicated by a bitmap with a size of P−K bits, where K is the number of elements in the intersection.

According to the codebook indication method in an embodiment of the present application, the port selection indication information includes first information and second information:
if two polarization directions selected by a terminal-side device correspond to same ports, the first information is used to indicate a union of ports corresponding to each transmission layer in one polarization direction: and the second information is used to indicate the ports corresponding to the each transmission layer in one polarization direction: or,
if two polarization directions selected by a terminal-side device correspond to different ports, the first information is used to indicate a union of ports corresponding to each transmission layer in the two polarization directions: and the second information is used to indicate the ports corresponding to the each transmission layer in the two polarization directions.

According to the codebook indication method in an embodiment of the present application, the first information is indicated by a combination number with a size of $$\left\lceil \log_2 \binom{P}{K_2} \right\rceil$$

bits:
where $K_2$ is the number of elements in the union

According to the codebook indication method in an embodiment of the present application, the first information is indicated by a bitmap with a size of P bits.

According to the codebook indication method in an embodiment of the present application, the second information is indicated by a combination number with a size of $$\left\lceil \log_2 \binom{K_2}{K_2'} \right\rceil$$

bits:
where $K_2$ is the number of elements in the union, and the size of $K_2'$ is the number of ports selected by the terminal-side device.

According to the codebook indication method in an embodiment of the present application, the size of $K_2'$ may be indicated by the network-side device to the terminal-side device through $\lceil \log_2 (K_2) \rceil$.

According to the codebook indication method in an embodiment of the present application, the second information is indicated by a bitmap with a size of $K_2$ bits,
where $K_2$ is the number of elements in the union.

According to the codebook indication method in an embodiment of the present application, for l-th transmission layer, the strongest coefficient indication information includes $\lceil \log_2 K_{l,0} \rceil$ bits of information, the $\lceil \log_2 K_{l,0} \rceil$ bits of information is used to indicate a target strongest coefficient in non-zero coefficients for the l-th transmission layer, where $K_{l,0}$ is the number of non-zero coefficients selected by a terminal-side device.

According to the codebook indication method in an embodiment of the present application, for l-th transmission layer, the strongest coefficient indication information includes $\lceil \log_2 M_l \rceil$ bits of information and $\lceil \log_2 K_{l,1} \rceil$ bits of information. The $\lceil \log_2 M_l \rceil$ bits of information and the $\lceil \log_2 K_{l,1} \rceil$ bits of information are used to jointly indicate a target strongest coefficient for the l-th transmission layer in non-zero coefficients, where $K_{l,1}$ is the number of ports selected by a terminal-side device, and $\lceil \log_2 M_l \rceil$ is used to indicate a frequency domain basis vector corresponding to the target strongest coefficient.

According to the codebook indication method in an embodiment of the present application, for l-th transmission layer, the strongest coefficient indication information includes $\lceil \log_2 K_{l,1} \rceil$ bits of information, the $\lceil \log_2 K_{l,1} \rceil$ bits of information is used to indicate a target strongest coefficient for the l-th transmission layer in non-zero coefficients, where $K_{l,1}$ is the number of ports selected by the terminal-side device.

According to the codebook indication method in an embodiment of the present application, for l-th transmission layer, the frequency domain basis vector indication information includes $$\left\lceil \log_2 \binom{2N-1}{M_l-1} \right\rceil$$

bits, where N is the number of frequency domain basis vectors configured by the network-side device for the terminal-side device, and $M_l$ is the number of frequency domain basis vectors selected by the terminal-side device.

According to the codebook indication method in an embodiment of the present application, for l-th transmission layer, the frequency domain basis vector indication information is indicated by a bitmap of size 2N−1 bits.

According to the codebook indication method in an embodiment of the present application, for l-th transmission layer, the frequency domain basis vector indication information includes $$\left\lceil \log_2 \binom{N-1}{M_l-1} \right\rceil$$

bits of information and $\lceil \log_2 N \rceil$ bits of information, and the $\lceil \log_2 N \rceil$ bits of information is used to indicate a frequency domain basis vector corresponding to a strongest coefficient.

According to the codebook indication method in an embodiment of the present application, for l-th transmission layer, the frequency domain basis vector indication information is indicated by a bitmap with a size of N−1 bits and $\lceil \log_2 N \rceil$ bits of information, and the $\lceil \log_2 N \rceil$ bits of information is used to indicate a frequency domain basis vector corresponding to a strongest coefficient.

According to the codebook indication method in an embodiment of the present application, for l-th transmission layer, the frequency domain basis vector indication information includes $$\left\lceil \log_2 \binom{N}{M_l} \right\rceil$$

bits.

According to the codebook indication method in an embodiment of the present application, for l-th transmission layer, the frequency domain basis vector indication information is indicated by a bitmap with a size of N bits.

According to the codebook indication method in an embodiment of the present application, the frequency domain basis vector indication information includes third information and fourth information:
the third information is used to indicate an intersection of frequency domain basis vectors corresponding to each transmission layer: and the fourth information is used to indicate remaining frequency domain basis vectors other than the intersection among frequency domain basis vectors corresponding to the each transmission layer.

According to the codebook indication method in an embodiment of the present application, the frequency domain basis vector indication information includes third information and fourth information:
the third information is used to indicate a union of frequency domain basis vectors corresponding to each transmission layer: and the fourth information is used to indicate the frequency domain basis vectors corresponding to the each transmission layer.

The embodiments of the present application further provide a codebook indication apparatus, including a memory, a transceiver, and a processor, where:

the memory, used to store computer programs: the transceiver, used to transmit and receive data under control of the processor: and the processor, used to read the computer programs in the memory and perform the following operations:

transmitting codebook indication information to a network-side device, where the codebook indication information includes at least one of following information of at least one transmission layer:

port selection indication information;

strongest coefficient indication information; or frequency domain basis vector indication information.

According to the codebook indication apparatus in an embodiment of the present application, the port selection indication information includes first information and second information:

if two polarization directions selected by a terminal-side device correspond to same ports, the first information is used to indicate an intersection of ports corresponding to each transmission layer in one polarization direction: and the second information is used to indicate remaining ports other than the intersection among ports corresponding to the each transmission layer in one polarization direction: or, if two polarization directions selected by a terminal-side device correspond to different ports, the first information is used to indicate an intersection of ports corresponding to each transmission layer in the two polarization directions: and the second information is used to indicate remaining ports other than the intersection among ports corresponding to the each transmission layer in the two polarization directions.

According to the codebook indication apparatus in an embodiment of the present application, the first information is indicated by a combination number with a size of $$\left\lceil \log_2 \binom{P}{K} \right\rceil$$

bits:

if the two polarization directions selected by the terminal-side device correspond to the same ports, P=X/2; if the two polarization directions selected by the terminal-side device correspond to different ports, P=X; X is the number of ports configured by the network-side device for the terminal-side device; K is the number of elements in the intersection.

According to the codebook indication apparatus in an embodiment of the present application, the first information is indicated by a bitmap with a size of P bits.

According to the codebook indication apparatus in an embodiment of the present application, the second information is indicated by a combination number with a size of $$\left\lceil \log_2 \binom{P-K}{K_{l,1} - K} \right\rceil$$

bits:

if the two polarization directions selected by the terminal-side device correspond to the same ports, $$K_{l,1} = \frac{P'_l}{2};$$

if the two polarization directions selected by the terminal-side device correspond to different ports, $K_{l,1}=P'_l$; X is the number of ports configured by the network-side device for the terminal-side device; K is the number of elements in the intersection: $P'_l$ is the number of ports selected by the terminal-side devices for l-th transmission layer.

According to the codebook indication apparatus in an embodiment of the present application, the second information is indicated by a bitmap with a size of P–K bits:

where K is the number of elements in the intersection.

According to the codebook indication apparatus in an embodiment of the present application, the port selection indication information includes first information and second information:

if two polarization directions selected by a terminal-side device correspond to same ports, the first information is used to indicate a union of ports corresponding to each transmission layer in one polarization direction: and the second information is used to indicate the ports corresponding to the each transmission layer in one polarization direction: or, if two polarization directions selected by a terminal-side device correspond to different ports, the first information is used to indicate a union of ports corresponding to each transmission layer in the two polarization directions: and the second information is used to indicate the ports corresponding to the each transmission layer in the two polarization directions.

According to the codebook indication apparatus in an embodiment of the present application, the first information is indicated by a combination number with a size of $$\left\lceil \log_2 \binom{P}{K_2} \right\rceil$$

bits:

where $K_2$ is the number of elements in the union.

According to the codebook indication apparatus in an embodiment of the present application, the first information is indicated by a bitmap with a size of P bits.

According to the codebook indication apparatus in an embodiment of the present application, the second information is indicated by a combination number with a size of $$\left\lceil \log_2 \binom{K_2}{K'_2} \right\rceil$$

bits:

where $K_2$ is the number of elements in the union, and the size of $K_2$ is indicated by the network-side device to the terminal-side device through $\lceil \log_2 (K_2) \rceil$.

According to the codebook indication apparatus in an embodiment of the present application, the second information is indicated by a bitmap with a size of $K_2$ bits:

where $K_2$ is the number of elements in the union.

According to the codebook indication apparatus in an embodiment of the present application, for l-th transmission layer, the strongest coefficient indication information includes $\lceil \log_2 K_{l,0} \rceil$ bits of information, the $\lceil \log_2 K_{l,0} \rceil$ bits of information is used to indicate a target strongest coefficient in non-zero coefficients for the l-th transmission layer, where $K_{l,0}$ is the number of non-zero coefficients selected by a terminal-side device.

According to the codebook indication apparatus in an embodiment of the present application, for l-th transmission layer, the strongest coefficient indication information includes $\lceil \log_2 M_l \rceil$ bits of information and $\lceil \log_2 K_{l,1} \rceil$ bits of information. The $\lceil \log_2 M_l \rceil$ bits of information and the $\lceil \log_2 K_{l,1} \rceil$ bits of information are used to jointly indicate a target strongest coefficient for the l-th transmission layer in non-zero coefficients, where $K_{l,1}$ is the number of ports selected by a terminal-side device, and $\lceil \log_2 M_l \rceil$ is used to indicate a frequency domain basis vector corresponding to the target strongest coefficient.

According to the codebook indication apparatus in an embodiment of the present application, for l-th transmission layer, the strongest coefficient indication information includes $\lceil \log_2 K_{l,1} \rceil$ bits of information, the $\lceil \log_2 K_{l,1} \rceil$ bits of information is used to indicate a target strongest coefficient for the l-th transmission layer in non-zero coefficients, where $K_{l,1}$ is the number of ports selected by the terminal-side device.

According to the codebook indication apparatus in an embodiment of the present application, for l-th transmission layer, the frequency domain basis vector indication information includes $$\left\lceil \log_2 \binom{2N-1}{M_l-1} \right\rceil$$

bits, where N is the number of frequency domain basis vectors configured by the network-side device for the terminal-side device, and $M_l$ is the number of frequency domain basis vectors selected by the terminal-side device.

According to the codebook indication apparatus in an embodiment of the present application, for l-th transmission layer, the frequency domain basis vector indication information is indicated by a bitmap with a size of 2N−1 bits.

According to the codebook indication apparatus in an embodiment of the present application, for l-th transmission layer, the frequency domain basis vector indication information includes $$\left\lceil \log_2 \binom{N-1}{M_l-1} \right\rceil$$

bits of information and $\lceil \log_2 N \rceil$ bits of information, and the $\lceil \log_2 N \rceil$ bits of information is used to indicate a frequency domain basis vector corresponding to a strongest coefficient.

According to the codebook indication apparatus in an embodiment of the present application, for l-th transmission layer, the frequency domain basis vector indication information is indicated by a bitmap with a size of N−1 bits and $\lceil \log_2 N \rceil$ bits of information, and the $\lceil \log_2 N \rceil$ bits of information is used to indicate a frequency domain basis vector corresponding to a strongest coefficient.

According to the codebook indication apparatus in an embodiment of the present application, for l-th transmission layer, the frequency domain basis vector indication information includes $$\left\lceil \log_2 \binom{N}{M_l} \right\rceil$$

bits.

According to the codebook indication apparatus in an embodiment of the present application, for l-th transmission layer, the frequency domain basis vector indication information is indicated by a bitmap with a size of N bits.

According to the codebook indication apparatus in an embodiment of the present application, the frequency domain basis vector indication information includes third information and fourth information:
the third information is used to indicate an intersection of frequency domain basis vectors corresponding to each transmission layer; and the fourth information is used to indicate remaining frequency domain basis vectors other than the intersection among frequency domain basis vectors corresponding to the each transmission layer.

According to the codebook indication apparatus in an embodiment of the present application, the frequency domain basis vector indication information includes third information and fourth information:
the third information is used to indicate a union of frequency domain basis vectors corresponding to each transmission layer: and the fourth information is used to indicate the frequency domain basis vectors corresponding to the each transmission layer.

The embodiments of the present application further provide a codebook indication apparatus, including:
a transmitting device, used for transmitting codebook indication information to a network-side device, where the codebook indication information includes at least one of following information of at least one transmission layer:
port selection indication information;
strongest coefficient indication information; or
frequency domain basis vector indication information.

The embodiments of the present application further provide a processor-readable storage medium storing computer programs, where the computer program, when executed by a processor, causes the processor to perform the steps of any one of the codebook instruction methods described above.

In the codebook indication method and apparatus, and the storage medium according to the embodiments of the present application, by indicating at least one of the port selection, the strongest coefficient of the combination coefficient matrix, and the frequency domain basis vector for at least one transmission layer, compared to traditional independent indication for each layer, the feedback overhead of some port indication, feedback overhead of the strongest coefficient indication, and overhead of frequency domain basis vector indication are reduced.

BRIEF DESCRIPTION OF THE DRAWINGS

To provide a clearer explanation for the solutions according to the embodiments of the present application, the accompanying drawings required in the description of the embodiments are briefly introduced below: The accompanying drawings in the following description are some embodiments of the present application.

DETAILED DESCRIPTION

Figure 1:
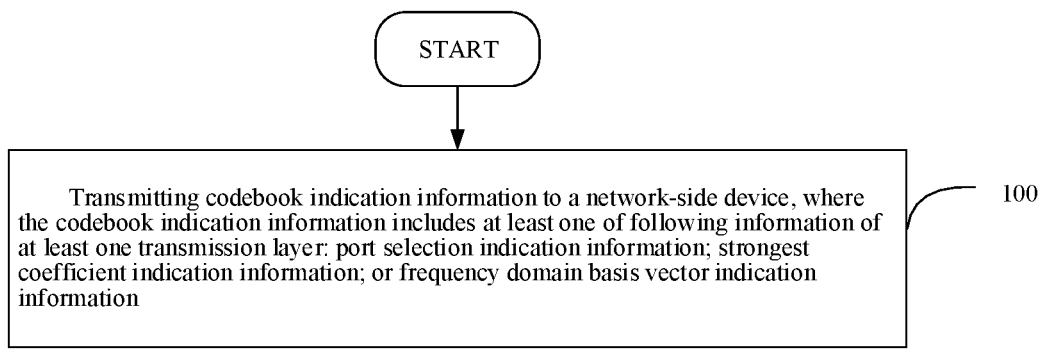
FIG. 1 is a schematic flowchart of a codebook indication method according to an embodiment of the present application.

The term "and/or" in the embodiments of the present application describes an association of the associated objects, indicating three types of relationships. For example, A and/or B may represent: A exists alone, A and B exist simultaneously, and B exists alone. The character "/" generally indicates that the associated objects are in an "or" relationship.

The term "multiple" in the embodiments of the present application refers to two or more, similar to other quantifiers.

The following provides a clear and complete description of the solution according to the embodiments of the present application in conjunction with the accompanying drawings. It should be noted that the described embodiments are only a part of the embodiments of the present application and not all of them.

The embodiments of the present application provide a codebook indication method and apparatus to indicate associated information of a codebook for at least one transmission layer to reduce indication overhead and feedback overhead.

The method and apparatus are based on the same conception. Due to the similar principles of problem-solving in the method and apparatus, the implementation of the apparatus and method may be referred to each other, and the repetition is omitted.

The solution provided in the embodiments of the present application may be applicable to various systems, especially 5G systems. For example, the applicable systems may be the global system of mobile communication (GSM), code division multiple access (CDMA) system, wideband code division multiple access (WCDMA) general packet radio service (GPRS) system, long term evolution (LTE) system, LTE frequency division duplex (FDD) system, LTE time division duplex (TDD) system, long term evolution advanced (LTE-A) system, universal mobile telecommunication system (UMTS), worldwide interoperability for microwave access (WiMAX) system, 5G new radio (NR) system, etc. These various systems all include terminal-side devices and network-side devices. The system may also include core network components, such as the evolved packet system (EPS), 5G system (5GS), etc.

For a Type II codebook, the codebook structure is W=W1W2 WfH. For the strongest coefficient indication (SCI) in W2, different SCI methods may be used for different rank values.

For example, when rank=1, the position of the strongest coefficient may be indicated by $\lceil \log_2 K^{NZ} \rceil$: and when rank>1, the position of the strongest coefficient may be indicated by $\lceil \log_2 (2L) \rceil$. $K^{NZ}$ is the number of non-zero coefficients fed back by a user equipment (UE) and L is the number of beams configured by the network side for UE.

For a frequency domain basis vector selection indication of Type II codebook, UE may first perform a unified phase rotation on each selected frequency domain basis vector for reporting before the UE indicates them, to make the index of the frequency domain basis vector corresponding to the strongest coefficient is 0 (assuming that index numbers of candidate frequency domain basis vectors are 0, 1 . . . . , N−1).

For example, for l-th transmission layer, a phase rotation matrix is:

$$R_l = \begin{pmatrix} 1 & 0 & 0 & 0 & 0 \\ 0 & e^{j2\pi \frac{k_{m_l^*}}{N_3}} & 0 & 0 & 0 \\ 0 & 0 & e^{j2\pi \frac{2k_{m_l^*}}{N_3}} & 0 & 0 \\ 0 & 0 & 0 & \ddots & 0 \\ 0 & 0 & 0 & 0 & e^{j2\pi \frac{(N_3-1)k_{m_l^*}}{N_3}} \end{pmatrix}$$

Where $k_{m_l^*} \in \{0, \ldots, N_3-1\}$ is an index of the $m_l^*$-th selected frequency domain basis vector. The phase-rotated frequency domain basis vector is $W_{f,l}^{(s)} = R_l W_{f,l}$, where $W_{f,l}$ is non-phase-rotated Mv selected frequency domain basis vectors. A base station uses $W_{f,l}^{(s)}$ to calculate a pre-code of the l-th transmission layer:

$$W_l' = W_{1,l} W_{2,l} W_{f,l}^{(s)H} = W_{1,l} W_{2,l} W_{f,l}^H R_l^H = W_l R_l^H.$$

$W_{1,l}$ and $W_{2,l}$ are the port selection matrix and combination coefficient matrix of the l-th transmission layer, respectively. The system performance is not affected if the same phase rotation is performed on each sub-band. Therefore, the frequency domain basis vector with index 0 must be selected, and the terminal-side device only needs to report the remaining frequency domain basis vectors.

According to the size N3 of a precoding matrix indicator (PMI) sub-band, the frequency domain basis vectors are indicated in two ways.

When N3<=19, the frequency domain basis vectors are indicated through $$\left\lceil \log_2 \binom{N_3 - 1}{M_l - 1} \right\rceil,$$

where $M_l$ is the number of the frequency domain basis vectors selected by the terminal-side device for the l-th transmission layer, and is configured by the network side. When N3>19, the frequency domain basis vectors are indicated jointly through $\lceil \log_2 (2M_l) \rceil$ and $$\left\lceil \log_2 \binom{2M_l - 1}{M_l - 1} \right\rceil.$$

$\lceil \log_2 (2M_l) \rceil$ is used to indicate a start point of a window with a size of $2M_l$, and $$\log_2 \binom{2M_l - 1}{M_l - 1}$$

is $M_l-1$ frequency domain basis vectors selected from the window.

FIG. 1 is a schematic flowchart of a codebook indication method according to an embodiment of the present application. As shown in FIG. 1, the method includes the following steps:

step 100, transmitting codebook indication information to a network-side device, where the codebook indication information includes at least one of following information of at least one transmission layer:

port selection indication information;

strongest coefficient indication information; or frequency domain basis vector indication information.

In an embodiment, a structure of a port selection codebook may be W=W1W2 WfH, where W1 is a port selection matrix and W2 is a combination coefficient matrix. To reduce feedback overhead, a position where a coefficient with a maximal amplitude, i.e., a strongest coefficient is located is indicated. Wf is a compressed frequency domain basis vector matrix. For l-th transmission layer, UE may select $M_l$ frequency domain basis vectors from N, where $M_l$<N.

In an embodiment, for the l-th transmission layer, the port selection codebook may be W=W1W2 WfH, $W_1 \in \mathbb{N}^{P \times K_{l,1}}$, $W_2 \in \mathbb{C}^{K_{l,1} \times M_l}$, $W_f \in \mathbb{C}^{N_3 \times M_l}$, where P is the number of CSI-RS ports configured by the network side for the terminal-side device: $K_{l,1}$ is the number of ports selected by the terminal-side device and may be configured by the network side or reported by the terminal-side device: $M_l$ is the number of frequency domain basis vectors and may be configured by the network side or selected and reported by the terminal-side device: and $N_3$ is the length of the frequency domain basis vector.

For the port selection codebook, the embodiments of the present application provide a reporting method for port selection indication, strongest coefficient indication, and frequency domain basis vector selection indication when rank>=1. The terminal-side device reports to the network side based on one or more of the determined port selection, the position of the strongest coefficient, and the selected frequency domain basis vector. The network side determines a data transmission precoding W based on one or more of the port selection indication, SCI, and frequency domain basis vector indication information reported from the terminal-side device.

For example, the terminal-side device may report the codebook indication information to the network-side device, and the codebook indication information may include the port selection indication information of the port selection matrix for at least one transmission layer:

for example, the terminal-side device may report the codebook indication information to the network-side device, and the codebook indication information may include the strongest coefficient indication information of the combination coefficient matrix for at least one transmission layer;

for example, the terminal-side device may report the codebook indication information to the network-side device, and the codebook indication information may include the frequency domain basis vector indication information of the compressed frequency domain basis vector matrix for at least one transmission layer;

for example, the terminal-side device may report the codebook indication information to the network-side device, and the codebook indication information may include any one or any combination of the followings:

port selection indication information;

strongest coefficient indication information; or frequency domain basis vector indication information.

In an embodiment, the terminal-side device may also be referred to as a terminal, or a terminal device:

the network-side device may also be referred to as a network side, or a network device.

In the codebook indication method according to the embodiments of the present application, by indicating at least one of the port selection, the strongest coefficient of the combination coefficient matrix, and the frequency domain basis vector for at least one transmission layer, compared to traditional independent indication for each layer, the feedback overhead of some port indication, feedback overhead of the strongest coefficient indication, and overhead of frequency domain basis vector indication may be reduced.

In an embodiment, the port selection indication information includes first information and second information:

if two polarization directions selected by the terminal-side device correspond to the same ports, the first information is used to indicate an intersection of ports corresponding to each transmission layer in one polarization direction: and the second information is used to indicate remaining ports other than the intersection among ports corresponding to the each transmission layer in one polarization direction: or if two polarization directions selected by the terminal-side device correspond to different ports, the first information is used to indicate an intersection of ports corresponding to each transmission layer in the two polarization directions: and the second information is used to indicate remaining ports other than the intersection among ports corresponding to the each transmission layer in the two polarization directions.

In an embodiment, in the port selection method when rank=1, the same ports may be selected in the two polarization directions, that is, ports at the same position in the two polarization directions, and $K_{l,1}/2$ ports are selected freely in each polarization direction, and the ports selected by the terminal are indicated through a combination number. Assuming that the network side configures P ports for the terminal, the terminal selects $K_{l,1}$ ports and reports the indication through $$\left\lceil \log_2 \binom{P/2}{K_{l,1}/2} \right\rceil,$$

where $K_{l,1}$<P.

In an embodiment, the network-side device may transmit a beamformed CSI-RS to the terminal-side device: the terminal-side device may determine one or more of the selected ports, the position of the strongest coefficient, and the selected frequency domain basis vectors based on the network-side device configuration information and the received beamformed CSI-RS.

In an embodiment, the network-side device may configure one or more of the number N of the frequency domain basis vectors, the number $K_{l,1}$ of antenna ports selected by the terminal, and the number $M_l$ of the frequency domain basis vectors selected by the terminal for the terminal-side device.

In an embodiment, assuming that the ports selected by the terminal-side device for each transmission layer are not fully the same, and the network-side device configures X CSI-RS ports for the terminal-side device, then P may be equal to X (different ports are selected in the two polarization directions) or P may be equal to X/2 (the same ports are selected in the two polarization directions).

In an embodiment, $P_l'$ may represent the number of ports selected by the terminal-side device for the l-th transmission layer, and Pt may be configured by the network-side device or selected and reported by the terminal-side device. For the l-th transmission layer, the terminal may select $K_{l,1}=P_l'$ ports (different ports are selected in the two polarization directions) or $$K_{l,1} = \frac{P_l'}{2}$$

ports (same ports are selected in the two polarization directions), where $$K_{l,1} = \frac{P'_l}{2}$$

represent that $$\frac{P'_l}{2}$$

ports are selected in one polarization direction and the same ports are selected in the two polarization directions.

In an embodiment, when rank>1, the terminal-side device may report the codebook indication information through two parts to indicate the ports selected for each layer.

For example, the terminal-side device may indicate the ports selected for each layer through the following scheme:
  the terminal-side device may report the codebook indication information through two parts. A first part reports the first information for each layer in one or two polarization directions, and a second part reports the second information for each layer in one or two polarization directions.

The first information may be an intersection of the ports selected for each transmission layer, and the second information may be remaining ports other than the intersection among the ports selected for each transmission layer.

For example, if the two polarization directions selected by the terminal-side device correspond to the same ports, the first information may be used to indicate an intersection of ports corresponding to each transmission layer in one polarization direction; and the second information may be used to indicate remaining ports other than the intersection among ports corresponding to the each transmission layer in one polarization direction: or
  if the two polarization directions selected by the terminal-side device correspond to different ports, the first information may be used to indicate an intersection of ports corresponding to each transmission layer in the two polarization directions: and the second information may be used to indicate the remaining ports other than the intersection among ports corresponding to the each transmission layer in the two polarization directions.

Compared to a traditional independent indication for each layer, the port selection indication method according to the embodiments of the present application may reduce the feedback overhead of some port indications by reporting the codebook indication information through two parts to indicate the ports selected for each layer.

In an embodiment, the first information is indicated by a combination number with a size of $$\left\lceil \log_2 \binom{P}{K} \right\rceil \text{ bits;}$$

if the two polarization directions selected by the terminal-side device correspond to the same ports, P=X/2; if the two polarization directions selected by the terminal-side device correspond to different ports, P=X; X is the number of ports configured by the network-side device for the terminal-side device; K is the number of elements in the intersection.

In an embodiment, the first information may be an intersection of the ports selected for each transmission layer, and the second information is the remaining ports other than the intersection among ports corresponding to the each transmission layer. The intersection of the ports selected for each transmission layer may be indicated through a combination number $$\left\lceil \log_2 \binom{P}{K} \right\rceil,$$

where K is the number of elements in the intersection of the ports selected for each layer.

If a combination number is used for reporting, the terminal-side device may indicate the size of K through $\lceil \log_2 (P) \rceil$ or $\lceil \log_2 (\min\{K_{l,1}\}) \rceil$, l=1, . . . , Rank or $\lceil \log_2 (P-\max\{K_{l,1}\}) \rceil$, where $\min\{K_{l,1}\}$ and $\max\{K_{l,1}\}$ are a minimum value and a maximum value among the elements in the set, which are also parameters configured by the network side, and Rank is the maximum number of transmission layers.

In an embodiment, the size of K is reported by the terminal through $\lceil \log_2 (P) \rceil$ or $\lceil \log_2 (\min\{K_{l,1}\}) \rceil$, l=1, . . . , Rank or $\lceil \log_2 (P-\max\{K_{l,1}\}) \rceil$, where $\min\{K_{l,1}\}$ is the minimum value in $\{K_{l,1}\}$, l=1, . . . , Rank, and $\max\{K_{l,1}\}$ is the maximum value in $\{K_{l,1}\}$, l=1, . . . , Rank, and Rank is the maximum number of transmission layers: when the same ports are selected in two polarization directions, $$K_{l,1} = \frac{P'_l}{2}, K_{l,1} = \frac{P'_l}{2}$$

indicating that $$\frac{P'_l}{2}$$

ports are selected in one polarization direction: when different ports are selected in two polarization directions, $K_{l,1}=P_1'$, $K_{l,1}=P_l'$ indicating that $P_l'$ ports are selected in two polarization directions and $P_l'$ is the number of ports selected by terminal side device for a l-th layer.

In an embodiment, the first information is indicated by a bitmap with a size of P bits;
  if the two polarization directions selected by the terminal-side device correspond to the same ports, P=X/2; if the two polarization directions selected by the terminal-side device correspond to different ports, P=X, X is the number of ports configured by the network-side device for the terminal-side device.

In an embodiment, the first information may be an intersection of the selected ports for each transmission layer, and the second information is the remaining ports other than the intersection among ports selected for the each transmission layer. The intersection of the ports selected for each layer may be indicated through a bitmap with a size of P bits by the first information, where K is the number of elements in the intersection of the ports selected for the each transmission layer.

In an embodiment, the size of K is reported by the terminal through $\lceil \log_2 (P) \rceil$ or $\lceil \log_2 (\min\{K_{l,1}\}) \rceil$, l=1, . . . , Rank or $\lceil \log_2 (P-\max\{K_{l,1}\}) \rceil$, where $\min\{K_{l,1}\}$ is the minimum value in $\{K_{l,1}\}$, l=1, . . . , Rank, $\max\{K_{l,1}\}$ is the maximum value in $\{K_{l,1}\}$, l=1, . . . , Rank, and Rank is the maximum number of transmission layers: when the same ports are $$K_{l,1} = \frac{P'_l}{2}, K_{l,1} = \frac{P'_l}{2}$$

indicating that $$\frac{P'_l}{2}$$

ports are selected in two polarization directions, selected in one polarization direction: when different ports are selected in two polarization directions, $K_{l,1}=P'_l$, $K_{l,1}=P$ indicating that Pt ports are selected in two polarization directions and $P'_l$ is the number of ports selected by terminal side device for a l-th layer.

In an embodiment, the second information is indicated by a combination number with a size of $$\left\lceil \log_2 \binom{P-K}{K_{l,1}-K} \right\rceil$$

bits.

if the two polarization directions selected by the terminal-side device correspond to the same ports, P=X/2, $$K_{l,1} = \frac{P'_l}{2};$$

if the two polarization directions selected by the terminal-side device correspond to different ports, P=X, $K_{l,1}=P'_l$; X is the number of ports configured by the network-side device for the terminal-side device; K is the number of elements in the intersection; $P'_l$ is the number of ports selected by the terminal-side device for the l-th transmission layer.

In an embodiment, the first information may be an intersection of the ports selected for each transmission layer, and the second information is the remaining ports other than the intersection among the ports selected for the each transmission layer. The remaining ports other than the intersection among the ports selected for the each transmission layer may be indicated through a combination number $$\left\lceil \log_2 \binom{P-K}{K_{l,1}-K} \right\rceil.$$

In an embodiment, if the second information is reported using a combination number, the size of $K_{l,1}-K$ may be indicated through $\lceil \log_2 (\max\{K_{l,1}\}-K) \rceil$. If the first information is indicated by a bitmap, it is not required to indicate the size of $K_{l,1}-K$.

In an embodiment, the size of K is reported by the terminal-side device through $\lceil \log_2 (P) \rceil$ or $\lceil \log_2 (\min\{K_{l,1}\}) \rceil$, l=1, . . . , Rank or $\lceil \log_2 (P-\max\{K_{l,1}\}) \rceil$, where $\min\{K_{l,1}\}$ is the minimum value in $\{K_{l,1}\}$, l=1, . . . , Rank, $\max\{K_{l,1}\}$ is the maximum value in $\{K_{l,1}\}$, l=1, . . . , Rank, and Rank is the maximum number of transmission layers; when the same ports are selected in two polarization directions, $$K_{l,1} = \frac{P'_l}{2}, K_{l,1} = \frac{P'_l}{2}$$

indicating that $$\frac{P'_l}{2}$$

ports are selected in one polarization direction: when different ports are selected in two polarization directions, $K_{l,1}=P$), $K_{l,1}=P$ indicating that Pt ports are selected in two polarization directions and Pt is the number of ports selected by terminal for l-th layer.

In an embodiment, the second information is indicated by a bitmap with a size of P–K bits;

if the two polarization directions selected by the terminal-side device correspond to the same ports, P=X/2; if the two polarization directions selected by the terminal-side device correspond to different ports, P=X, K is the number of elements in the intersection.

In an embodiment, the first information may be an intersection of the ports selected for each transmission layer, and the second information is the remaining ports other than the intersection among the ports selected for the each transmission layer. The remaining ports other than the intersection among the ports selected for the each transmission layer may be indicated through a bitmap of size P–K by the second information.

In an embodiment, the size of K is reported by the terminal-side device through $\lceil \log_2 (P) \rceil$ or $\lceil \log_2 (\min\{K_{l,1}\}) \rceil$, l=1, . . . , Rank or $\lceil \log_2 (P-\max\{K_{l,1}\}) \rceil$, where $\min\{K_{l,1}\}$ is the minimum value in $\{K_{l,1}\}$, l=1, . . . , Rank, $\max\{K_{l,1}\}$ is the maximum value in $\{K_{l,1}\}$, l=1, . . . , Rank, and Rank is the maximum number of transmission layers: when the same ports are selected in two polarization directions, $$K_{l,1} = \frac{P'_l}{2}, K_{l,1} = \frac{P'_l}{2}$$

indicating that $$\frac{P'_l}{2}$$

ports are selected in one polarization direction: when different ports are selected in two polarization directions, $K_{l,1}=P'_l$, $K_{l,1}=P'_l$ indicating that $P'_l$ ports are selected in two polarization directions and Pt is the number of ports selected by the terminal side device for l-th layer.

For example, the first information may be an intersection of the ports selected for each transmission layer, and the second information may be the remaining ports other than the intersection among the ports selected for the each transmission layer.

Assuming that the base station configures a CSI-RS resource including X ports for UE, where X=32, with rank=2 for two-layer data transmission, and the same ports are selected in two polarization directions, that is, ports selected in two polarization directions have the same position, then P=X/2=16. Assuming that 16 ports and 12 ports are selected for each layer in two polarization directions, respectively, that is, $P_1'==16$, $P_2'=12$ which are reported to the base station through UE, $K_{l,1}=8$, $K_{2,1}=6$.

Figure 2:
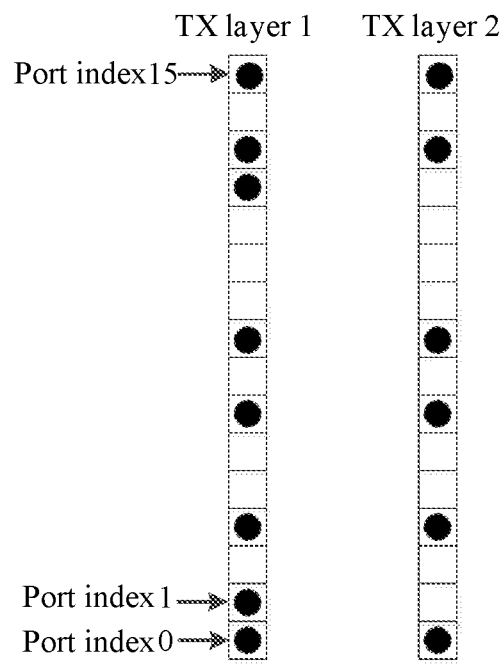
FIG. 2 is a first schematic diagram of a port selection indication method according to an embodiment of the present application.

FIG. 2 is a first schematic diagram of a port selection indication method according to an embodiment of the present application. FIG. 2 shows a distribution of ports selected by the terminal in one polarization direction on a two-layer transmission. A point corresponding to a port in the FIG. 2 indicates that the port is selected, otherwise the port is not selected. Each transmission (TX) layer (TX layer) may be indicated by a combination number $$\left\lceil \log_2 \binom{P}{K_{l,1}} \right\rceil + \lceil \log_2(P) \rceil$$

or a bitmap with a size of P=16 bits. The port indication overhead required for rank=2 is 35 bits and 32 bits.

The terminal indicates ports selected for the two layers by reporting a bitmap with a size of P=16 bits, as shown in table 1. In the table 1, 0 indicates that a port is not selected, and 1 indicates that a port is selected.

TABLE 1

Intersection of selected ports for a two-layer transmission

| | Port index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Bitmap | 1 | 0 | 0 | 1 | 0 | 0 | 1 | 0 | 1 | 0 | 0 | 0 | 0 | 1 | 0 | 1 |

From the table 1, it may be seen that the number of elements in the intersection for the two-layer transmission is 6, which means that these two layers select 6 same ports, and then indicate the number of remaining ports selected for the first layer and the number of ports selected for the second layer through $$\lceil \log_2(P) \rceil + \left\lceil \log_2 \binom{P-K}{K_{l,1}-K} \right\rceil = 10$$

and 4 bits, respectively. A total overhead for indicating the selected ports for the two layers is 16+10+4=30 bits. Compared to an independent indication for each layer, it may reduce by 6 bits or 4 bits.

Assuming rank=4 for a four-layer data transmission, and the ports selected in two polarization directions are the same, i.e., the positions of the ports selected in two polarization directions are the same, P=X/2=16. Assuming that the first layer and the second layer both select 16 ports in two polarization directions, and the third layer and the fourth layer select 12 ports, i.e., $P_1'=P_2'=16$ and $P_3'=P_4'=8$, which are reported to the base station by UE, then $K_{1,1}=K_{2,1}=8$, $K_{3,1}=K_{4,1}=4$.

Figure 3:
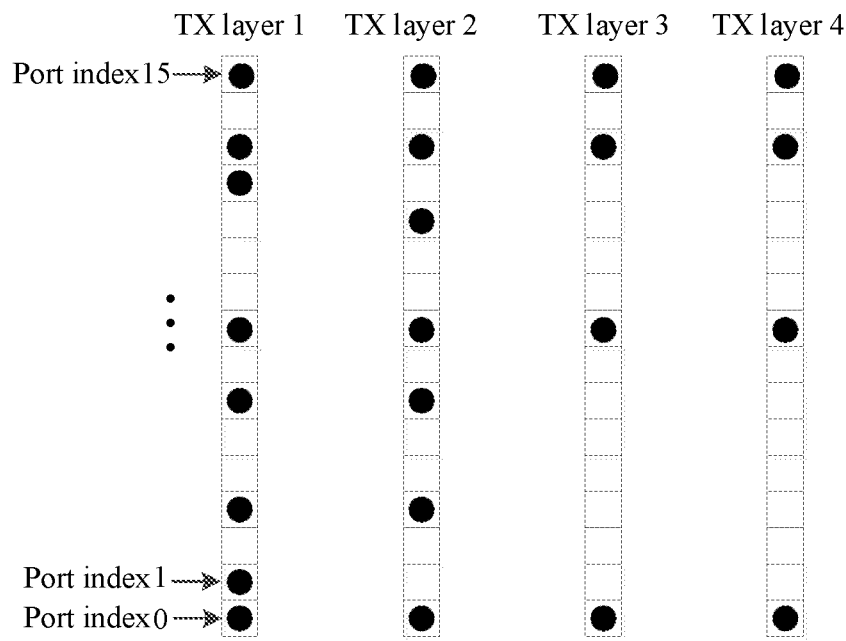
FIG. 3 is a second schematic diagram of a port selection indication method according to an embodiment of the present application.

If each layer is indicated by P=16 bits, the port indication overhead required for rank=4 is 64 bits. FIG. 3 is a second schematic diagram of a port selection indication method according to an embodiment of the present application, assuming that a distribution of ports selected for a four-layer transmission is as shown in FIG. 3. FIG. 3 shows a distribution of ports selected by the terminal in one polarization direction for a four-layer transmission. The terminal indicates an intersection of the ports selected for the four layers by reporting a bitmap with a size of P=16 bits, as shown in table 2.

TABLE 2

Intersection of selected ports for a four-layer transmission

| | Port index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Bitmap | 1 | 0 | 0 | 0 | 0 | 0 | 0 | 0 | 1 | 0 | 0 | 0 | 0 | 1 | 0 | 1 |

From the table 2, it may be seen that the number of elements in the selected intersection for the four-layer transmission is 4, which means that these four layers select 4 same ports, and then the remaining 2 ports selected for the first layer and the second layer are indicated by $$\lceil \log_2(P) \rceil + \left\lceil \log_2\left(\begin{array}{c} P-K \\ K_{l,1}-K \end{array}\right) \right\rceil = 10$$

bits, l=1, 2, and the number of ports selected for the third layer and fourth layer is indicated by $\lceil \log_2(P) \rceil = 4$ bits, l=3, 4. A total overhead for indicating the ports selected for the four layers is 16+10+10+4+4=44 bits. Compared to an independent indication for each layer, it may reduce by 20 bits.

In an embodiment, the port selection indication information includes first information and second information:
  if the two polarization directions selected by the terminal-side device correspond to the same ports, the first information is used to indicate a union of ports corresponding to each transmission layer in one polarization direction: and the second information is used to indicate ports corresponding to the each transmission layer in one polarization direction: or,
  if the two polarization directions selected by the terminal-side device correspond to different ports, the first information is used to indicate a union of ports corresponding to each transmission layer in two polarization directions: and the second information is used to indicate the ports corresponding to the each transmission layer in the two polarization directions.

In an embodiment, assuming that the ports selected by the terminal-side device for each transmission layer are not fully the same, and the network-side device configures X CSI-RS ports for the terminal-side device, then P may be equal to X (different ports are selected in the two polarization directions) or P may be equal to X/2 (the same ports are selected in the two polarization directions).

In an embodiment, $P_l'$ may represent the number of ports selected by the terminal-side device for the l-th transmission layer, and $P_l'$ may be configured by the network-side device or selected and reported by the terminal-side device. For the l-th layer, the terminal may select $K_{l,1}=P_l'$ ports (different ports are selected in the two polarization directions) or $$K_{l,1} = \frac{P_l'}{2}$$

ports (the same ports are selected in the two polarization directions), where $$K_{l,1} = \frac{P_l'}{2}$$

represents that $$\frac{P_l'}{2}$$

ports are selected in one polarization direction and the same ports are selected in the two polarization directions.

In an embodiment, when rank>1, the terminal-side device may report the codebook indication information through two parts to indicate the ports selected for each layer.

For example, the terminal-side device may indicate the ports selected for each layer through the following scheme:
  the terminal-side device may report the codebook indication information through two parts. A first part reports the first information for each layer in one or two polarization directions, and a second part reports the second information for each layer in one or two polarization directions.

The first information may be a union of the ports selected for each transmission layer, and the second information may indicate the ports selected for each transmission layer within the union, respectively.

In an embodiment, if two polarization directions selected by the terminal-side device correspond to the same ports, the first information may be used to indicate a union of ports corresponding to each transmission layer in one polarization direction: and the second information is used to indicate the ports corresponding to the each transmission layer in one polarization direction: or,
  if the two polarization directions selected by the terminal-side device correspond to different ports, the first information may be used to indicate a union of ports corresponding to each transmission layer in the two polarization directions: and the second information may be used to indicate the ports corresponding to the each transmission layer in the two polarization directions.

In an embodiment, the first information is indicated by a combination number with a size of $$\left\lceil \log_2\binom{P}{K_2} \right\rceil$$

bits:
  if the two polarization directions selected by the terminal-side device correspond to the same ports, P=X/2; if the two polarization directions selected by the terminal-side device correspond to different ports, P=X: $K_2$ is the number of elements in the union.

In an embodiment, the first information may be a union of the ports selected for each transmission layer, and the second information may indicate the ports selected for each transmission layer within the union, respectively, where the first information may indicate the union of the ports selected for each layer by a combination number $$\left\lceil \log_2\binom{P}{K_2} \right\rceil,$$

where $K_2$ is the number of elements in the union of the ports selected for each layer. If a combination number is used for reporting, the size of $K_2$ is indicated by $\lceil \log_2(P) \rceil$, $\lceil \log_2(\max\{K_{l,1}\}) \rceil$, l=1, ..., Rank or $\lceil \log_2(P-\min\{K_{l,1}\}) \rceil$.

In an embodiment, the size of $K_2$ is reported by the terminal through $\lceil \log_2(P) \rceil$, $\lceil \log_2(\max\{K_{l,1}\}) \rceil$, l=1, ..., Rank or $\lceil \log_2(P-\min\{K_{l,1}\}) \rceil$, where $\min\{K_{l,1}\}$ is a minimum value in $\{K_{l,1}\}$, l=1, ..., Rank, $\max\{K_{l,1}\}$ is a maximum value in $\{K_{l,1}\}$, l=1, ..., Rank, and rank is a maximum number of transmission layers.

In an embodiment, the first information is indicated by a bitmap with a size of P bits:

if the two polarization directions selected by the terminal-side device correspond to the same ports, P=X/2; if the two polarization directions selected by the terminal-side device correspond to different ports, P=X.

In an embodiment, the first information may be a union of the ports selected for each transmission layer, the second information may indicate the ports selected for a transmission layer within the union, respectively, where the first information may indicate a union of the ports selected for each layer through a bitmap with a size of P, where $K_2$ is the number of elements in the union of the ports selected for each layer.

In an embodiment, the size of $K_2$ is reported by the terminal through $\lceil \log_2 (P) \rceil$, $\lceil \log_2 (\max\{K_{l,1}\}) \rceil$, l=1, ..., Rank or $\lceil \log_2 (P-\min\{K_{l,1}\}) \rceil$, where $\min\{K_{l,1}\}$ is a minimum value in $\{K_{l,1}\}$, l=1, ..., Rank, $\max\{K_{l,1}\}$ is a maximum value in $\{K_{l,1}\}$, l=1, ..., Rank, and rank is a maximum number of transmission layers.

In an embodiment, the second information is indicated by a combination number with a size of bits:

$$\left\lceil \log_2 \binom{K_2}{K_2'} \right\rceil$$

where $K_2$ is the number of elements in the union, and the size of $K_2'$ is the number of ports selected by the terminal-side device.

In an embodiment, the first information may be a union of the ports selected for each transmission layer, the second information may indicate the ports selected for a transmission layer within the union, respectively, where the second information may indicate the ports selected for a transmission layer within the union through a combination number $$\left\lceil \log_2 \binom{K_2}{K_2'} \right\rceil.$$

In an embodiment, if the second information is represented by a combination number, the size of $K_2'$ may be indicated by $\lceil \log_2 (K_2) \rceil$. If the first information is indicated by a bitmap, then it is not required to indicate the size of $K_2'$.

In an embodiment, the second information is indicated by a bitmap with a size of $K_2$ bits:

where $K_2$ is the number of elements in the union.

In an embodiment, the first information may be a union of the ports selected for each transmission layer, the second information may indicate the ports selected for a transmission layer within the union, respectively, where the second information may indicate the ports selected for a transmission layer within the union through a bitmap with a size of $K_2$.

For example, the first information is a union of the ports selected for each layer, and the second information indicates the ports selected for each transmission layer within the union.

Assuming rank-4 for four-layer data transmission, and the ports selected in two polarization directions are the same, that is, the positions of the ports selected in two polarization directions are the same, and P=X/2=16. Assuming that the first layer and the second layer select 16 ports in the two polarization directions, and the third layer and fourth layer select 12 ports respectively, that is, $P_1'=P_2'=16$ and $P_3'=P_4'=8$, which are reported to the base station by UE, then $K_{1,1}=K_{2,1}=8$, $K_{3,1}=K_{4,1}=4$. A union of ports selected for each layer is shown in table 3.

TABLE 3

| Union of selected ports for a four-layer transmission | | | | | | | | | | | | | | | | |
|---|---|---|---|---|---|---|---|---|---|---|---|---|---|---|---|---|
| Port index | | | | | | | | | | | | | | | | |
| | 0 | 1 | 2 | 3 | 4 | 5 | 6 | 7 | 8 | 9 | 10 | 11 | 12 | 13 | 14 | 15 |
| Bitmap | 1 | 0 | 0 | 0 | 0 | 0 | 0 | 0 | 1 | 0 | 0 | 0 | 0 | 1 | 0 | 1 |

From the table 3, it may be seen that the number of elements in the union for the four-layer transmission is 4, which means that these four layers select 4 same ports, and then the 8 ports selected for the first layer and the second layer may be indicated by $\lceil \log_2 (P) \rceil +$ $$\left\lceil \log_2 \binom{P-K}{K_{l,1}-L} \right\rceil = 8$$

bits, l=1, 2, and 4 ports selected for the third layer and fourth layer may be indicated by $$\lceil \log_2(P) \rceil + \left\lceil \log_2 \binom{P-K}{K_{l,1}-K} \right\rceil = 11$$

bits, l=3,4. The total overhead for indicating the ports selected for the four layers is 16+8+8+11+11=54 bits.

Compared to an independent indication for each layer, the port indication method provided in the embodiments of the present application may reduce an overhead of 10 bits, which effectively saves indication overhead.

In an embodiment, for the l-th transmission layer, the strongest coefficient indication information includes $\lceil \log_2 K_{l,0} \rceil$ bits of information, and the $\lceil \log_2 K_{l,0} \rceil$ bits of information is used to indicate the target strongest coefficient among the non-zero coefficients for the l-th transmission layer, where $K_{l,0}$ is the number of non-zero coefficients selected by the terminal-side device.

In an embodiment, for the strongest coefficient indication when rank≥1, for the l-th transmission layer, the strongest coefficient indication information includes $\lceil \log_2 K_{l,0} \rceil$ bits of information, and the $\lceil \log_2 K_{l,0} \rceil$ bits of information is used to indicate the target strongest coefficient among the non-zero coefficients for the l-th transmission layer, where $K_{l,0}$ is the number of non-zero coefficients selected by the terminal-side device.

In an embodiment, for the l-th transmission layer, assuming that the number of ports selected by the terminal is $K_{l,1}$, and the number of selected non-zero coefficients is $K_{l,0}$; $K_{l,1}$, and $K_{l,0}$ may be configured by the network-side device or reported by the terminal-side device to the network-side device.

In an embodiment, the network side configures one or more of the followings for the terminal: the number N of frequency domain basis vectors, the number $K_{l,1}$ of antenna ports selected by the terminal, and the number $M_l$ of frequency domain basis vectors selected by the terminal.

For the l-th transmission layer, when Wf is closed, i.e., the compressed frequency domain basis vector matrix only contains My frequency domain basis vector, where $M_l=1$, the terminal may report SCI by indicating the position of the strongest coefficient by reporting $\lceil \log_2 K_{l,0} \rceil$.

In an embodiment, the method for indicating the strongest coefficient when rank>=1 provided in the embodiments of the present application includes SCI indication method after phase rotation and SCI indication method without phase rotation. For rank>=1, the SCI indication method provided in the embodiments of the present application may reduce the feedback overhead of strongest coefficient indication and the overhead of frequency domain basis vector indication.

In an embodiment, for the l-th transmission layer, the strongest coefficient indication information includes $\lceil \log_2 M_l \rceil$ bits of information and $\lceil \log_2 K_{l,1} \rceil$ bits of information. The $\lceil \log_2 M_l \rceil$ bits of information and $\lceil \log_2 K_{l,1} \rceil$ bits of information are used to jointly indicate the target strongest coefficient for the transmission layer l among the non-zero coefficients, where $K_{l,1}$ is the number of ports selected by the terminal-side device, and $\lceil \log_2 M_l \rceil$ is used to indicate the frequency domain basis vector corresponding to the target strongest coefficient.

In an embodiment, for the strongest coefficient indication when rank≥1, for the l-th transmission layer, the strongest coefficient indication information includes $\lceil \log_2 M_l \rceil$ bits of information and $\lceil \log_2 K_{l,1} \rceil$ bits of information, and the $\lceil \log_2 M_l \rceil$ bits of information and the $\lceil \log_2 K_{l,1} \rceil$ bits of information are used to jointly indicate the target strongest coefficient for the transmission layer (among the non-zero coefficients, where $K_{l,1}$ is the number of ports selected by the terminal-side device, and $\lceil \log_2 M_l \rceil$ is used to indicate the frequency domain basis vector corresponding to the target strongest coefficient.

For the l-th transmission layer, when Wf is closed, i.e., the compressed frequency domain basis vector matrix only contains $M_l$ frequency domain basis vector, where $M_l=1$, the terminal may report SCI by indicating the position of the strongest coefficient by reporting $\lceil \log_2 K_{l,1} \rceil$.

For the l-th transmission layer, when Wf is opened, i.e., the compressed frequency domain basis vector matrix contains $M_l$ frequency domain basis vectors, where $M_l>1$, the terminal may report SCI by indicating the position of the strongest coefficient by reporting $\lceil \log_2 K_{l,1} \rceil$.

In an embodiment, for the l-th transmission layer, the strongest coefficient indication information includes $\lceil \log_2 K_{l,1} \rceil$ bits of information, and the $\lceil \log_2 K_{l,1} \rceil$ bits of information is used to indicate the target strongest coefficient for the transmission layer l among non-zero coefficients, where $K_{l,1}$ is the number of ports selected by the terminal-side device.

In an embodiment, for the strongest coefficient indication when rank≥1, for the l-th transmission layer, the strongest coefficient indication information includes $\lceil \log_2 K_{l,1} \rceil$ bits of information, and the $\lceil \log_2 K_{l,1} \rceil$ bits of information is used to indicate the target strongest coefficient for the transmission layer l among non-zero coefficients, where $K_{l,1}$ is the number of ports selected by the terminal-side device.

In an embodiment, for the l-th transmission layer, when Wf is opened, i.e., the compressed frequency domain basis vector matrix contains $M_l$ frequency domain basis vectors, where $M_l>1$, the terminal may report SCI by indicating the position of the strongest coefficient by reporting $\lceil \log_2 M_l \rceil$ and $\lceil \log_2 K_{l,1} \rceil$, where $\lceil \log_2 M_l \rceil$ indicates the frequency domain basis vector corresponding to the strongest coefficient.

For example, if SCI indication is not performed, assuming that coefficient amplitude and phase are quantified using 3 bits and 4 bits respectively, 7 bits are required for the strongest coefficient report.

Assuming that Wf is closed, i.e., the compressed frequency domain basis vector matrix only contains My frequency domain basis vector, where $M_l=1$. For the first transmission layer, the number of non-zero coefficients selected by the terminal is $K_{1,0}$, where $K_{1,0}=12$, and for the second transmission layer, the number of non-zero coefficients is $K_{2,0}$, where $K_{2,0}=12$. Then, the terminal indicates the positions of the strongest coefficients of the first layer and the second layer through $\lceil \log_2 K_{l,0} \rceil=4$ and 3 bits, respectively.

Assuming Wf is opened, i.e., the compressed frequency domain basis vector matrix only contains $M_l$ frequency domain basis vectors, where $M_l>1$. The terminal reports to the base station that $M_1=M_2=4$ frequency domain basis vectors are selected for the first layer and the second layer, where the first layer and the second layer are configured with a same number of ports $K_{1,1}=K_{2,1}=16$, and the terminal indicates the position of the strongest coefficient by reporting $\lceil \log_2 K_{l,1} \rceil=4$ bits.

In an embodiment, the terminal-side device may indicate an FD basis corresponding to the strongest coefficients of the first layer and the second layer by $\lceil \log_2 M_l \rceil=2$ bits, and then indicate the positions of the strongest coefficients of the first layer and the second layer by $\lceil \log_2 K_{l,1} \rceil=4$ bits, respectively.

Compared to the related art, the SCI indication in the embodiments of the present application may reduce the overhead by 1-4 bits, and the indication overhead is effectively reduced.

In an embodiment, for the l-th transmission layer, the frequency domain basis vector indication information includes $$\left\lceil \log_2 \binom{2N-1}{M_l-1} \right\rceil$$

bits, where N is the number of frequency domain basis vector configured by the network-side device for the terminal-side device, and $M_l$ is the number of frequency domain basis vectors corresponding to the transmission layer l.

In an embodiment, the network-side device may configure the number N of frequency domain basis vectors for the terminal-side device.

In an embodiment, for frequency domain basis vector indication when rank≥1, for the l-th transmission layer, the size of the frequency domain basis vector indication information may be $$\left\lceil \log_2 \binom{2N-1}{M_l-1} \right\rceil$$

bits, where N is the number of frequency domain basis vectors configured by the network-side device for the terminal-side device, and My is the number of frequency domain basis vectors corresponding to the transmission layer l.

In an embodiment, the network side configures N frequency domain basis vectors for the terminal. When Wf is opened, for the l-th transmission layer, the terminal is required to select $M_l$ frequency domain basis vectors from N, where $M_l>1$, and the terminal reports the selected frequency domain basis vectors by reporting $$\left\lceil \log_2 \binom{2N-1}{M_l-1} \right\rceil.$$

In an embodiment, for the l-th transmission layer, the frequency domain basis vector indication information is indicated by a bitmap with a size of 2N−1.

In an embodiment, for frequency domain basis vector indication when rank≥1, for the l-th transmission layer, the frequency domain basis vector indication information is indicated by a bitmap with a size of 2N−1.

In an embodiment, the network side configures N frequency domain basis vectors for the terminal. When Wf is opened, for the l-th transmission layer, the terminal may select $M_l$ frequency domain basis vectors from N, where $M_l>1$, and the terminal indicates the selected frequency domain basis vectors through a bitmap with a size of 2N−1.

In an embodiment, for the l-th transmission layer, the frequency domain basis vector indication information includes $$\left\lceil \log_2 \binom{N-1}{M_l-1} \right\rceil$$

bits of information and $\lceil \log_2 N \rceil$ bits of information, where My is the number of frequency domain basis vectors corresponding to the transmission layer l, and the $\lceil \log_2 N \rceil$ bits of information is used to indicate the frequency domain basis vector corresponding to the strongest coefficient.

In an embodiment, for frequency domain basis vector indication when rank≥1, for the I-th transmission layer, the frequency domain basis vector indication information includes $$\left\lceil \log_2 \binom{N-1}{M_l-1} \right\rceil$$

bits of information and $\lceil \log_2 N \rceil$ bits of information, where $M_l$ is the number of frequency domain basis vectors corresponding to the transmission layer l and the $\lceil \log_2 N \rceil$ bits of information is used to indicate the frequency domain basis vector corresponding to the strongest coefficient.

In an embodiment, the network side configures N frequency domain basis vectors for the terminal. When Wf is opened, for the l-th transmission layer, the terminal may select $M_l$ frequency domain basis vectors from N, where $M_l>1$. The terminal indicates through reporting $\lceil \log_2 N \rceil$ and $$\left\lceil \log_2 \binom{N-1}{M_l-1} \right\rceil,$$

where $\lceil \log_2 N \rceil$ indicates the frequency domain basis vector corresponding to the strongest coefficient.

In an embodiment, for the l-th transmission layer, the frequency domain basis vector indication information is indicated by a bitmap with a size of N−1 bits and $\lceil \log_2 N \rceil$ bits of information, the $\lceil \log_2 N \rceil$ bits of information is used to indicate the frequency domain basis vector corresponding to the strongest coefficient.

In an embodiment, for frequency domain basis vector indication when rank≥1, for the l-th transmission layer, the frequency domain basis vector indication information is indicated by a bitmap with a size of N−1 bits and $\lceil \log_2 N \rceil$ bits of information, where the $\lceil \log_2 N \rceil$ bits of information is used to indicate the frequency domain basis vector corresponding to the strongest coefficient.

In an embodiment, the network side configures N frequency domain basis vectors for the terminal. When Wf is opened, for the l-th transmission layer, the terminal may select $M_l$ frequency domain basis vectors from N, where $M_l>1$. The terminal reports a bitmap with a size of N−1 bits and $\lceil \log_2 N \rceil$ bits of information to indicate, where the $\lceil \log_2 N \rceil$ indicates the frequency domain basis vector corresponding to the strongest coefficient.

In an embodiment, for the l-th transmission layer, the frequency domain basis vector indication information includes $$\left\lceil \log_2 \binom{N}{M_l} \right\rceil$$

bits, $M_l$ is the number of frequency domain basis vectors corresponding to the transmission layer l.

In an embodiment, for frequency domain basis vector indication when rank≥1, for the l-th transmission layer, the size of the frequency domain basis vector indication information is $$\left\lceil \log_2 \binom{N}{M_l} \right\rceil$$

bits, $M_l$ is the number of frequency domain basis vectors corresponding to the transmission layer l.

In an embodiment, the network side configures N frequency domain basis vectors for the terminal. When Wf is opened, for the l-th transmission layer, the terminal may select $M_l$ frequency domain basis vectors from N, where $M_l>1$, and the terminal indicates through $$\left\lceil \log_2 \binom{N}{M_l} \right\rceil$$

reporting bits of information, where $M_l$ is the number of frequency domain basis vectors corresponding to the transmission layer l.

In an embodiment, for the l-th transmission layer, the frequency domain basis vector indication information is indicated by a bitmap with a size of N bits.

In an embodiment, for frequency domain basis vector indication when rank≥1, for the l-th transmission layer, the frequency domain basis vector indication information is a bitmap with a size of N bits.

In an embodiment, the network side configures N frequency domain basis vectors for the terminal. When Wf is opened, for the l-th transmission layer, the terminal may select $M_l$ frequency domain basis vectors from N, where $M_l>1$, and the terminal indicates through reporting a bitmap with a size of N bits.

In an embodiment, if the frequency domain basis vectors selected by all layers are the same, the terminal-side device may indicate the frequency domain basis vectors through $$\left\lceil \log_2 \binom{2N-1}{M-1} \right\rceil$$

or a bitmap with a size of 2N−1, or indicate the frequency domain basis vectors selected by all the layers through $\lceil \log_2 N \rceil$ and $$\left\lceil \log_2 \binom{N-1}{M-1} \right\rceil$$

or a bitmap with a size of N−1 bits.

For example, if the network configures the terminal with N frequency domain basis vectors, where N=4, and when Wf is opened, for the l-th transmission layer, the terminal is required to select $M_l$=2 frequency domain basis vectors from the 4 frequency domain basis vectors, and the terminal indicates through reporting $$\left\lceil \log_2 \binom{2N-1}{M_l-1} \right\rceil = 3$$

bits or a bitmap with a size of 2N−1=7. For example, 1 or 0 in the bitmap indicates that the frequency domain basis vector is selected or not selected.

For example, the terminal indicates selected frequency domain basis vector by reporting $\lceil \log_2 N \rceil$=2 bits and $$\left\lceil \log_2 \binom{N-1}{M_l-1} \right\rceil = 2$$

bits or a bitmap with a size of N−1=3 bits, where $\lceil \log_2 N \rceil$=2 bits indicates the frequency domain basis vector corresponding to the strongest coefficient.

For example, the terminal indicates the selected frequency domain basis vector by reporting $$\left\lceil \log_2 \binom{N}{M_l} \right\rceil = 3$$

bits or a bitmap with a size of N=4 bits.

For example, if the frequency domain basis vectors selected for all layers are the same, the terminal indicates the frequency domain basis vectors selected for the all layers through $$\left\lceil \log_2 \binom{2N-1}{M-1} \right\rceil = 3$$

bits or a bitmap with size of 2N−1=7 bits, or $\lceil \log_2 N \rceil$=2 bits and $$\left\lceil \log_2 \binom{N-1}{M-1} \right\rceil = 2$$

bits or a bitmap with a size of N−1=3 bits.

For example, assuming rank-4, the commonly used frequency domain basis vector indication requires $$\left( \lceil \log_2(N) \rceil + \left\lceil \log_2 \binom{N-1}{M_v-1} \right\rceil \right) * \text{rank} = 16$$

bits, where $\lceil \log_2 (N) \rceil$ indicates the frequency domain basis vector corresponding to the strongest coefficient, and $$\left\lceil \log_2 \binom{N-1}{M_v-1} \right\rceil$$

is the remaining Mv−1 frequency domain basis vectors. The frequency domain basis vector indication method mentioned above only requires $$\left( \left\lceil \log_2 \binom{2N-1}{M_v-1} \right\rceil \right) * RI = 12$$

bits, and compared with prior commonly used indication methods, the indication method provided in the embodiments of the present application may reduce 4 bits.

In an embodiment, the frequency domain basis vector indication information includes third information and fourth information:

the third information is used to indicate an intersection of frequency domain basis vectors corresponding to each transmission layer: the fourth information is used to indicate remaining frequency domain basis vectors other than the intersection among the frequency domain basis vectors corresponding to the each transmission layer.

In an embodiment, the frequency domain basis vector may also be indicated through two parts to report, and the indication method is the same as the two-part reporting indication method described in the port selection indication.

In an embodiment, if the third information is used to indicate an intersection of frequency domain basis vectors corresponding to each transmission layer, and the fourth information is used to indicate remaining frequency domain basis vectors other than the intersection among the frequency domain basis vectors corresponding to the each transmission layer, then the third information may be indicated by a combination number with a size of $$\left\lceil \log_2 \binom{Z}{Y} \right\rceil$$

bits, where parameter Z is the number of candidate frequency domain basis vectors, and Y is a set of frequency domain basis vectors.

In an embodiment, if the third information is used to indicate an intersection of frequency domain basis vectors corresponding to each transmission layer, and the fourth information is used to indicate remaining frequency domain basis vectors other than the intersection among the frequency domain basis vectors corresponding to the each transmission layer, then the third information may be indicated by a bitmap with a size of Z bits, where parameter Z is the number of candidate frequency domain basis vectors.

In an embodiment, if the third information is used to indicate an intersection of frequency domain basis vectors corresponding to each transmission layer, and the fourth information is used to indicate remaining frequency domain basis vectors other than the intersection among the frequency domain basis vectors corresponding to the each transmission layer, then the fourth information may be indicated by a combination number with a size of $$\left\lceil \log_2 \binom{Z-Y}{Y_{l,1}-Y} \right\rceil,$$

where parameter Z is the number of candidate frequency domain basis vectors, Y is a set of frequency domain basis vectors, $Y_{l,1}$ is the number of frequency domain basis vectors for the l-th layer, and Y' is the number of frequency domain basis vectors selected for that layer:

in an embodiment, the size of Y is reported by the terminal-side device through $\lceil \log_2 (Z) \rceil$, or $\lceil \log_2 (\min\{Y_{l,1}\}) \rceil$, l=1, ..., Rank, or $\lceil \log_2 (Z-\max\{Y_{l,1}\}) \rceil$, $\min\{Y_{l,1}\}$ is a minimum value in $\{Y_{l,1}\}$, l=1, ..., Rank, max $\{Y_{l,1}\}$ is a maximum value in $\{Y_{l,1}\}$, l=1, ..., Rank, and rank is a maximum number of transmission layers: $K_{l,1}=Z_l'$, $Z_l'$ is the number of frequency domain basis vectors selected by the terminal for the l-th layer.

In an embodiment, if the third information is used to indicate an intersection of frequency domain basis vectors corresponding to each transmission layer, and the fourth information is used to indicate remaining frequency domain basis vectors other than the intersection among the frequency domain basis vectors corresponding to the each transmission layer, then the fourth information may be indicated by a bitmap with a size of Z-Y bits, where parameter Z is the number of candidate frequency domain basis vectors, and Y is a set of frequency domain basis vectors.

In an embodiment, the frequency domain basis vector indication information includes third information and fourth information:

the third information is used to indicate a union of frequency domain basis vectors corresponding to each transmission layer: the fourth information is used to indicate the frequency domain basis vectors corresponding to the each transmission layer.

If the third information is used to indicate a union of frequency domain basis vectors corresponding to each transmission layer, and the fourth information is used to indicate the frequency domain basis vectors corresponding to each transmission layer, then the third information may be indicated by a combination number with a size of $$\left\lceil \log_2 \binom{Z}{Y} \right\rceil$$

bits, where parameter Z is the number of candidate frequency domain basis vectors, and Y is the set of frequency domain basis vectors.

If the third information is used to indicate a union of frequency domain basis vectors corresponding to each transmission layer, and the fourth information is used to indicate the frequency domain basis vectors corresponding to each transmission layer, then the third information is indicated by a bitmap with a size of Z bits, where the parameter Z is the number of candidate frequency domain basis vectors.

If the third information is used to indicate a union of frequency domain basis vectors corresponding to each transmission layer, and the fourth information is used to indicate the frequency domain basis vectors corresponding to each transmission layer, then the fourth information is indicated by a combination number with a size of $$\left\lceil \log_2 \binom{Y}{Y'} \right\rceil,$$

where Y is the set of frequency domain basis vectors.

If the third information is used to indicate a union of frequency domain basis vectors corresponding to each transmission layer, and the fourth information is used to indicate the frequency domain basis vectors corresponding to each transmission layer, then the fourth information may be indicated by a bitmap with a size of Y bits, where Y is the set of frequency domain basis vectors.

In an embodiment, in each embodiment of the present application, for frequency domain basis vector indication when rank≥1, indication may be performed in two ways. Way 1 is to indicate the frequency domain basis vectors with and without phase rotation based on N frequency domain basis vectors configured by the network side. In Way 2, the indication method of port selection may also be used, i.e., reporting and indicating the frequency domain basis vectors selected for each layer in two parts.

For rank>=1, the SCI indication method and frequency domain basis vector indication method provided in various embodiments of the present application may reduce the feedback overhead of strongest coefficient indication and overhead of frequency domain basis vector indication.

In the codebook indication method according to the embodiments of the present application, by indicating at least one of the port selection, the strongest coefficient of the combination coefficient matrix, and the frequency domain basis vector for at least one transmission layer, compared to traditional independent indication for each layer, the feedback overhead of some port indication, feedback overhead of the strongest coefficient indication, and overhead of frequency domain basis vector indication may be reduced.

The terminal devices referred to in the embodiments of the present application may be devices that provide voice and/or data connectivity to users, handheld devices with wireless connection functions, or other processing devices connected to wireless modems. In different systems, names of terminal devices may also vary. For example, in 5G systems, terminal devices may be referred to as user equipment (UE). Wireless terminal devices may communicate with one or more core networks (CN) through radio access networks (RAN). Wireless terminal devices may be mobile terminal devices, such as mobile phones or cellular phones and computers with mobile terminal devices, such as portable, pocket, handheld, computer built-in, or vehicle mounted mobile devices, and they exchange language and/or data with wireless access networks. For example, personal communication service (PCS) phones, cordless phones, session initiated protocol (SIP) phones, wireless local loop (WLL) stations, personal digital assistants (PDA), and other devices. Wireless terminal devices may also be referred to as systems, subscriber units, subscriber stations, mobile stations, remote stations, access points, remote terminals, access terminals, user terminals, user agents, user device, and they are not limited in the embodiments of the present application.

The network devices referred to in the present embodiment may be a base station, and the base station may include multiple cells providing services for a terminal. According to different scenarios, base stations may also be referred to as access points, or they may be devices in the access network that communicate with wireless terminal devices through one or more sectors on an air interface, or they may be referred to as other names. Network devices may be used to exchange received air frames with Internet protocol (IP) packets, serving as routers between wireless terminal devices and the rest of the access network, where the rest of the access network may include the IP communication network. Network devices may also coordinate attribute management of air interfaces. For example, the network device referred to in the embodiments of the present application may be a base transceiver station (BTS) in the Global System for Mobile Communications (GSM) or code division multiple access (CDMA), or a NodeB in wide-band code division multiple access (WCDMA), and may also be an evolutional Node B (eNB or e-NodeB) in a long term evolution (LTE) system, a gNB in a 5G network architecture (next generation system), or a home evolved Node B (HeNB), relay node, femto, pico, etc., which is not limited in the embodiments of the present application. In some network structures, network devices may include centralized unit (CU) nodes and distributed unit (DU) nodes, and centralized units and distributed units may also be geographically separated.

Network devices and terminal devices may each use one or more antennas for multi input multi output (MIMO) transmission, the MIMO transmission may be single user MIMO (SU-MIMO) or multiple user MIMO (MU-MIMO). According to the shape and number of the combination of antennas, MIMO transmission may be 2D-MIMO, 3D-MIMO, FD-MIMO, or massive MIMO, as well as diversity transmission, precoding transmission, beamforming transmission, etc.

Figure 4:
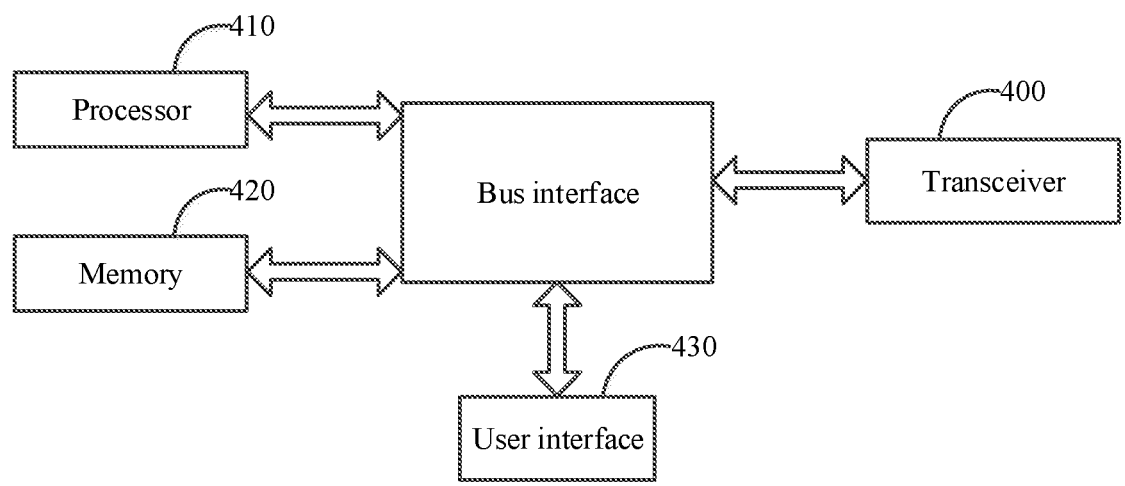
FIG. 4 is a first schematic structural diagram of a codebook indication apparatus according to an embodiment of the present application.

FIG. 4 is a first schematic structural diagram of a codebook indication apparatus according to an embodiment of the present application. As shown in FIG. 4, the codebook indication apparatus includes a memory, a transceiver, and a processor, where:

the memory, used to store computer programs: the transceiver, used to transmit and receive data under control of the processor: and the processor, used to read computer programs in the memory and perform the following operations:

transmitting codebook indication information to a network-side device, where the codebook indication information includes at least one of following information of at least one transmission layer:

port selection indication information;

strongest coefficient indication information; or frequency domain basis vector indication information.

In the codebook indication apparatus according to the embodiments of the present application, by indicating at least one of the port selection, the strongest coefficient of the combination coefficient matrix, and the frequency domain basis vector for at least one transmission layer, compared to traditional independent indication for each layer, the feedback overhead of some port indication, feedback overhead of the strongest coefficient indication, and overhead of frequency domain basis vector indication may be reduced.

In FIG. 4, the bus architecture may include any number of interconnected buses and bridges, for example, the bus architecture may be linked together through one or more processors represented by processor 410 and various circuits of memory represented by memory 420. The bus architecture may also link various other circuits such as peripheral devices, regulators, and power management circuits together. The bus interface provides an interface. The transceiver 400 may be multiple components, including a transmitter and a receiver, providing a unit for communicating with various other apparatus on a transmission medium, where the transmission medium includes wireless channels, wired channels, optical cables, and other transmission media. For different user devices, the user interface 430 may be an interface that may connect external and internal devices, including but not limited to keyboards, displays, speakers, microphones, joysticks, etc.

The processor 410 is used to manage the bus architecture and usual processing, and the memory 420 may store data used by processor 400 during operations.

In an embodiment, the processor 410 may be a central processing unit (CPU), an application specific integrated circuit (ASIC), a field programmable gate array (FPGA), or a complex programmable logic device (CPLD), and the processor may adopt a multi-core architecture.

The processor is used to execute, based on obtained executable instructions, any one of the methods according to the embodiments of the present application, by invoking a computer program stored in the memory. The processor and the memory may also be provided physically separately:

In an embodiment, the port selection indication information includes first information and second information:

if two polarization directions selected by a terminal-side device correspond to same ports, the first information is used to indicate an intersection of ports corresponding to each transmission layer in one polarization direction: and the second information is used to indicate remaining ports other than the intersection among ports corresponding to the each transmission layer in one polarization direction: or, if two polarization directions selected by a terminal-side device correspond to different ports, the first information is used to indicate an intersection of ports corresponding to each transmission layer in the two polarization directions: and the second information is used to indicate remaining ports other than the intersection among ports corresponding to the each transmission layer in the two polarization directions.

In an embodiment, the first information is indicated by a combination number with a size of $$\left\lceil \log_2 \binom{P}{K} \right\rceil$$

bits:

if the two polarization directions selected by the terminal-side device correspond to the same ports, P=X/2; if the two polarization directions selected by the terminal-side device correspond to different ports, P=X; X is the number of ports configured by the network-side device for the terminal-side device; K is the number of elements in the intersection.

In an embodiment, the first information is indicated by a bitmap with a size of P bits:
  if the two polarization directions selected by the terminal-side device correspond to the same ports, P=X/2; if the two polarization directions selected by the terminal-side device correspond to different ports, P=X.

In an embodiment, the second information is indicated by a combination number with a size of $$\left\lceil \log_2 \binom{P-K}{K_{l,1}-K} \right\rceil$$

bits:
  if the two polarization directions selected by the terminal-side device correspond to the same ports, $$K_{l,1} = \frac{P'_l}{2};$$

if the two polarization directions selected by the terminal-side device correspond to different ports, $K_{l,1}=P'_l$; X is the number of ports configured by the network-side device for the terminal-side device; K is the number of elements in the intersection; $P'_l$ is the number of ports selected by the terminal-side devices for l-th transmission layer.

In an embodiment, the second information is indicated by a bitmap with a size of P–K bits:
  where K is the number of elements in the intersection.

In an embodiment, the port selection indication information includes first information and second information:
  if two polarization directions selected by a terminal-side device correspond to same ports, the first information is used to indicate a union of ports corresponding to each transmission layer in one polarization direction: and the second information is used to indicate the ports corresponding to the each transmission layer in one polarization direction: or,
  if two polarization directions selected by a terminal-side device correspond to different ports, the first information is used to indicate a union of ports corresponding to each transmission layer in the two polarization directions: and the second information is used to indicate the ports corresponding to the each transmission layer in the two polarization directions.

In an embodiment, the first information is indicated by a combination number with a size of bits;

$$\left\lceil \log_2 \binom{P}{K_2} \right\rceil$$

where $K_2$ is the number of elements in the union.

In an embodiment, the first information is indicated by a bitmap with a size of P bits.

In an embodiment, the second information is indicated by a combination number with a size of $$\left\lceil \log_2 \binom{K_2}{K'_2} \right\rceil$$

bits;

where $K_2$ is the number of elements in the union, and the size of $K_2'$ is the number of ports selected by the terminal-side device.

In an embodiment, the second information is indicated by a bitmap with a size of $K_2$ bits:
  where $K_2$ is the number of elements in the union.

In an embodiment, for l-th transmission layer, the strongest coefficient indication information includes $\lceil \log_2 K_{l,0} \rceil$ bits of information, and the $\lceil \log_2 K_{l,0} \rceil$ bits of information is used to indicate a target strongest coefficient in non-zero coefficients for the l-th transmission layer, where $K_{l,0}$ is the number of non-zero coefficients selected by a terminal-side device.

In an embodiment, for l-th transmission layer, the strongest coefficient indication information includes $\lceil \log_2 M_l \rceil$ bits of information and $\lceil \log_2 K_{2,l} \rceil$ bits of information. The $\lceil \log_2 M_l \rceil$ bits of information and $\lceil \log_2 K_{l,1} \rceil$ bits of information are used to jointly indicate a target strongest coefficient for the l-th transmission layer in non-zero coefficients, where $K_{l,1}$ is the number of ports selected by a terminal-side device, and $\lceil \log_2 M_l \rceil$ is used to indicate a frequency domain basis vector corresponding to the target strongest coefficient.

In an embodiment, for l-th transmission layer, the strongest coefficient indication information includes $\lceil \log_2 K_{l,1} \rceil$ bits of information, the $\lceil \log_2 K_{l,1} \rceil$ bits of information is used to indicate a target strongest coefficient for the l-th transmission layer in non-zero coefficients.

In an embodiment, for l-th transmission layer, the frequency domain basis vector indication information includes $$\left\lceil \log_2 \binom{2N-1}{M_l - 1} \right\rceil$$

bits, where N is the number of frequency domain basis vectors configured by the network-side device for the terminal-side device and $M_l$ is the number of frequency domain basis vectors selected by the terminal-side device.

In an embodiment, for l-th transmission layer, the frequency domain basis vector indication information is indicated by a bitmap with a size of 2N–1 bits.

In an embodiment, for l-th transmission layer, the frequency domain basis vector indication information includes $$\left\lceil \log_2 \binom{N-1}{M_l - 1} \right\rceil$$

bits of information and $\lceil \log_2 N \rceil$ bits of information, and the $\lceil \log_2 N \rceil$ bits of information is used to indicate a frequency domain basis vector corresponding to a strongest coefficient.

In an embodiment, for l-th transmission layer, the frequency domain basis vector indication information is indicated by a bitmap with a size of N–1 bits and $\lceil \log_2 N \rceil$ bits of information, the $\lceil \log_2 N \rceil$ bits of information is used to indicate a frequency domain basis vector corresponding to a strongest coefficient.

In an embodiment, for the l-th transmission layer, the frequency domain basis vector indication information includes $$\left\lceil \log_2 \binom{N}{M_l} \right\rceil$$

bits.

In an embodiment, for l-th transmission layer, the frequency domain basis vector indication information is indicated by a bitmap with a size of N bits.

In an embodiment, the frequency domain basis vector indication information includes third information and fourth information:

the third information is used to indicate an intersection of frequency domain basis vectors corresponding to each transmission layer; and the fourth information is used to indicate remaining frequency domain basis vectors other than the intersection among the frequency domain basis vectors corresponding to the each transmission layer.

In an embodiment, the frequency domain basis vector indication information includes third information and fourth information:

the third information is used to indicate a union of frequency domain basis vectors corresponding to each transmission layer; and the fourth information is used to indicate the frequency domain basis vectors corresponding to the each transmission layer.

In the codebook indication apparatus according to the embodiments of the present application, by indicating at least one of the port selection, the strongest coefficient of the combination coefficient matrix, and the frequency domain basis vector for at least one transmission layer, compared to traditional independent indication for each layer, the feedback overhead of some port indication, feedback overhead of the strongest coefficient indication, and overhead of frequency domain basis vector indication may be reduced.

Figure 5:
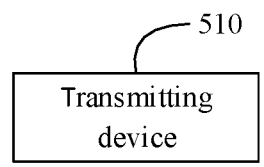
FIG. 5 is a second schematic structural diagram of a codebook indication apparatus according to an embodiment of the present application.

FIG. 5 is a second schematic structural diagram of a codebook indication apparatus according to an embodiment of the present application. As shown in FIG. 5, the codebook indication apparatus includes: a transmitting device 510, where:

the transmitting device 510 is used for transmitting codebook indication information to a network-side device, where the codebook indication information includes at least one of following information of at least one transmission layer:
port selection indication information;
strongest coefficient indication information; or
frequency domain basis vector indication information.

For example, the codebook indication apparatus may transmit codebook indication information to the network-side device through the transmitting device 510, the codebook indication information includes at least one of the following information of at least one transmission layer:
port selection indication information;
strongest coefficient indication information; or
frequency domain basis vector indication information.

In the codebook indication apparatus according to the embodiments of the present application, by indicating at least one of the port selection, the strongest coefficient of the combination coefficient matrix, and the frequency domain basis vector for at least one transmission layer, compared to traditional independent indication for each layer, the feedback overhead of some port indication, feedback overhead of the strongest coefficient indication, and overhead of frequency domain basis vector indication may be reduced.

It should be noted that the above apparatus according to the embodiments of the present disclosure may implement all methods and steps performed by the above method embodiments, and may achieve the same effects. The same parts and effects as the method embodiments are not repeated.

In an embodiment, the port selection indication information includes first information and second information:

if two polarization directions selected by a terminal-side device correspond to same ports, the first information is used to indicate an intersection of ports corresponding to each transmission layer in one polarization direction; and the second information is used to indicate remaining ports other than the intersection among ports corresponding to the each transmission layer in one polarization direction; or, if two polarization directions selected by a terminal-side device correspond to different ports, the first information is used to indicate an intersection of ports corresponding to each transmission layer in the two polarization directions; and the second information is used to indicate remaining ports other than the intersection among ports corresponding to the each transmission layer in the two polarization directions.

In an embodiment, the first information is indicated by a combination number with a size of $$\left\lceil \log_2 \binom{P}{K} \right\rceil$$

bits;

if the two polarization directions selected by the terminal-side device correspond to the same ports, P=X/2; if the two polarization directions selected by the terminal-side device correspond to different ports, P=X; X is the number of ports configured by the network-side device for the terminal-side device; K is the number of elements in the intersection.

In an embodiment, the first information is indicated by a bitmap with a size of P bits:

if the two polarization directions selected by the terminal-side device correspond to the same ports, P=X/2; if the two polarization directions selected by the terminal-side device correspond to different ports, P=X.

In an embodiment, the second information is indicated by a combination number with a size of $$\left\lceil \log_2 \binom{P-K}{K_{l,1}-K} \right\rceil$$

bits;

if the two polarization directions selected by the terminal-side device correspond to the same ports, $$K_{l,1} = \frac{P'_l}{2};$$

if the two polarization directions selected by the terminal-side device correspond to different ports, $K_{l,1}=P'_l$; X is the number of ports configured by the network-side device for the terminal-side device; $P'_l$ is the number of ports selected by the terminal-side devices for l-th transmission layer.

In an embodiment, the second information is indicated by a bitmap with a size of P−K bits.

In an embodiment, the port selection indication information includes first information and second information:

if two polarization directions selected by a terminal-side device correspond to same ports, the first information is used to indicate a union of ports corresponding to each transmission layer in one polarization direction: and the second information is used to indicate ports corresponding to the each transmission layer in one polarization direction: or, if two polarization directions selected by a terminal-side device correspond to different ports, the first information is used to indicate a union of ports corresponding to each transmission layer in the two polarization directions: and the second information is used to indicate the ports corresponding to the each transmission layer in the two polarization directions.

In an embodiment, the first information is indicated by a combination number with a size of $$\left\lceil \log_2 \binom{P}{K_2} \right\rceil$$

bits:

where $K_2$ is the number of elements in the union.

In an embodiment, the first information is indicated by a bitmap with a size of P bits.

In an embodiment, the second information is indicated by a combination number with a size of $$\left\lceil \log_2 \binom{K_2}{K_2'} \right\rceil$$

bits, and the size of the combination number is $$\left\lceil \log_2 \binom{K_2}{K_2'} \right\rceil$$

bits:

where the size of $K_2'$ is the number of ports selected by the terminal-side device.

In an embodiment, the second information is indicated by a bitmap with a size of $K_2$ bits.

In an embodiment, for l-th transmission layer, the strongest coefficient indication information includes $\lceil \log_2 K_{l,0} \rceil$ bits of information, and the $\lceil \log_2 K_{l,0} \rceil$ bits of information is used to indicate a target strongest coefficient in non-zero coefficients for the l-th transmission layer, where $K_{l,0}$ is the number of non-zero coefficients selected by a terminal-side device.

In an embodiment, for l-th transmission layer, the strongest coefficient indication information includes $\lceil \log_2 M_l \rceil$ bits of information and $\lceil \log_2 K_{l,1} \rceil$ bits of information. The $\lceil \log_2 M_l \rceil$ bits of information and $\lceil \log_2 K_{l,1} \rceil$ bits of information are used to jointly indicate a target strongest coefficient for the l-th transmission layer in non-zero coefficients, where $K_{l,1}$ is the number of ports selected by a terminal-side device, and $\lceil \log_2 M_l \rceil$ is used to indicate a frequency domain basis vector corresponding to the target strongest coefficient.

In an embodiment, for l-th transmission layer, the strongest coefficient indication information includes $\lceil \log_2 K_{l,1} \rceil$ bits of information, the $\lceil \log_2 K_{l,1} \rceil$ bits of information is used to indicate a target strongest coefficient for the l-th transmission layer in non-zero coefficients.

In an embodiment, for l-th transmission layer, the frequency domain basis vector indication information includes $$\left\lceil \log_2 \binom{2N-1}{M_l-1} \right\rceil$$

bits, where N is the number of frequency domain basis vectors configured by the network-side device for the terminal-side device and $M_l$ is the number of frequency domain basis vectors selected by the terminal-side device.

In an embodiment, for l-th transmission layer, the frequency domain basis vector indication information is indicated by a bitmap with a size of 2N−1 bits.

In an embodiment, for l-th transmission layer, the frequency domain basis vector indication information includes $$\left\lceil \log_2 \binom{N-1}{M_l-1} \right\rceil$$

bits of information and $\lceil \log_2 N \rceil$ bits of information, and the $\lceil \log_2 N \rceil$ bits of information is used to indicate a frequency domain basis vector corresponding to a strongest coefficient.

In an embodiment, for l-th transmission layer, the frequency domain basis vector indication information is indicated by a bitmap with a size of N−1 bits and $\lceil \log_2 N \rceil$ bits of information, the $\lceil \log_2 N \rceil$ bits of information is used to indicate a frequency domain basis vector corresponding to a strongest coefficient.

In an embodiment, for l-th transmission layer, the frequency domain basis vector indication information includes $$\left\lceil \log_2 \binom{N}{M_l} \right\rceil$$

bits.

In an embodiment, for l-th transmission layer, the frequency domain basis vector indication information is indicated by a bitmap with a size of N bits.

In an embodiment, the frequency domain basis vector indication information includes third information and fourth information:

the third information is used to indicate an intersection of frequency domain basis vectors corresponding to each transmission layer: and the fourth information is used to indicate remaining frequency domain basis vectors other than the intersection among the frequency domain basis vectors corresponding to the each transmission layer.

In an embodiment, the frequency domain basis vector indication information includes third information and fourth information:

the third information is used to indicate a union of frequency domain basis vectors corresponding to each transmission layer: and the fourth information is used to indicate the frequency domain basis vectors corresponding to the each transmission layer.

In the codebook indication apparatus according to the embodiments of the present application, by indicating at least one of the port selection, the strongest coefficient of the combination coefficient matrix, and the frequency domain basis vector for at least one transmission layer, compared to traditional independent indication for each layer, the feedback overhead of some port indication, feedback overhead of the strongest coefficient indication, and overhead of frequency domain basis vector indication may be reduced.

It should be noted that the division of units in the embodiments of the present application is schematic and only serves as a logical functional division. In actual implementation, other division approaches may be applied. In addition, in various embodiments of the present application, each functional unit may be integrated into a single processing unit, each unit may exist physically separately, or two or more units may be integrated into one unit. The integrated unit mentioned above may be implemented in both hardware and software functional units.

If the integrated unit is implemented in a form of a software functional unit and sold or used as an independent product, the integrated unit may be stored in a processor-readable storage medium. Based on such understanding, the solution disclosed in the present application that essentially or partially contribute to the prior art, or all or part of the solutions may be reflected in the form of a software product. The computer software product is stored in a storage medium, including several instructions to enable a computer device (which may be a personal computer, server, or network device, etc.) or processor to execute all or part of the steps of the methods described in various embodiments of the present application. The aforementioned storage media include: USB flash drives, mobile hard drives, read only memory (ROM), random access memory (RAM), magnetic disks or optical discs, and other media that may store program code.

It should be noted that the above apparatus provided by the embodiments of the present disclosure may achieve all methods and steps implemented by the above method embodiments, and may achieve the same effects. The same parts and effects as the embodiments in the present embodiment will not be further described.

On the other hand, the embodiment of the present disclosure further provides a processor-readable storage medium, and the processor-readable storage medium stores a computer program for causing a processor to execute the methods according to the aforementioned embodiments, the method including:

transmitting codebook indication information to a network-side device, where the codebook indication information includes at least one of following information of at least one transmission layer:
port selection indication information;
strongest coefficient indication information; or
frequency domain basis vector indication information.

The processor-readable storage medium may be any available medium or data storage device that the processor may access, including but not limited to magnetic memory (such as floppy disks, hard disks, magnetic tapes, magneto-optical disks (MO), etc.), optical memory (such as CDs, DVDs, BD, HVDs, etc.), and semiconductor memory (such as ROM, EPROM, EEPROM, non-volatile memory (NAND FLASH), solid-state drive (SSD), etc.).

The embodiments disclosed herein may be provided as methods, systems, or computer program products. Therefore, this application may take the form of complete hardware embodiments, complete software embodiments, or embodiments combining software and hardware aspects. Moreover, the present application may take a form of computer program products implemented on one or more computer available storage medium (including but not limited to disk storage, optical storage, etc.) containing computer available program codes.

The present application is described with reference to the flowcharts and/or block diagrams of the methods and devices (systems), and computer program product according to the embodiments of the present application. It should be understood that each process and/or box in the flowchart and/or block diagram, as well as the combination of processes and/or boxes in the flowchart and/or block diagram, may be implemented by computer executable instructions. These computer executable instructions may be provided to processors of general-purpose computers, specialized computers, embedded processors, or other programmable data processing devices to generate a machine, allowing instructions executed by processors of computers or other programmable data processing devices to generate devices for implementing functions specified in one or more steps of a flowchart or one or more blocks in a block diagram.

These processor executable instructions may also be stored in a processor readable memory that may guide computers or other programmable data processing devices to work in a specific way, causing the instructions stored in the processor readable memory to generate manufactures including an instruction device, the instruction device implementing the functions specified in one or more processes and/or blocks of a flowchart.

These processor executable instructions may also be loaded onto a computer or other programmable data processing device to perform a series of operational steps on the computer or other programmable device to generate computer-implemented processing. The instructions executed on the computer or other programmable device provide steps for implementing the functions specified in one or more processes and/or blocks of a flowchart.

What is claimed is:

1. A codebook indication method, the method comprising:
transmitting codebook indication information to a network-side device, the codebook indication information comprising strongest coefficient indication information of at least one transmission layer;
wherein
for l-th transmission layer, the strongest coefficient indication information comprises $\lceil \log_2 K_{l,0} \rceil$ bits of information, the $\lceil \log_2 K_{l,0} \rceil$ bits of information being used to indicate a target strongest coefficient in non-zero coefficients for the l-th transmission layer, wherein $K_{l,0}$ is a number of non-zero coefficients selected by a terminal-side device; or,
for l-th transmission layer, the strongest coefficient indication information comprises $\lceil \log_2 M_l \rceil$ bits of information and $\lceil \log_2 K_{l,1} \rceil$ bits of information, the $\lceil \log_2 M_l \rceil$ bits of information and the $\lceil \log_2 K_{l,1} \rceil$ bits of information being used to jointly indicate a target strongest coefficient for the l-th transmission layer in non-zero coefficients, wherein $K_{l,1}$ is a number of ports selected by a terminal-side device, $\lceil \log_2 M_l \rceil$ is used to indicate a frequency domain basis vector corresponding to the target strongest coefficient, and $M_l$ is a number of frequency domain basis vectors selected by the terminal-side device; or,
for l-th transmission layer, the strongest coefficient indication information comprises $\lceil \log_2 K_{l,1} \rceil$ bits of information, the $\lceil \log_2 K_{l,1} \rceil$ bits of information being used to indicate a target strongest coefficient for the l-th transmission layer in non-zero coefficients, wherein $K_{l,1}$ is a number of ports selected by a terminal-side device.

2. The codebook indication method of claim 1, wherein th codebook indication information further comprises port selection indication information of the at least one transmission layer and wherein the port selection indication information comprises first information and second information;

when two polarization directions selected by the terminal-side device correspond to same ports, the first information is used to indicate an intersection of ports corresponding to each transmission layer in one polarization direction; and the second information is used to indicate remaining ports other than the intersection among ports corresponding to each transmission layer in one polarization direction; or, when two polarization directions selected by the terminal-side device correspond to different ports, the first information is used to indicate an intersection of ports corresponding to each transmission layer in the two polarization directions; and the second information is used to indicate remaining ports other than the intersection among ports corresponding to each transmission layer in the two polarization directions.

3. The codebook indication method of claim 2, wherein the first information is indicated by a combination number with a size of $$\left\lceil \log_2 \binom{P}{K} \right\rceil$$

bits; or, the first information is indicated by a bitmap with a size of P bits;

when the two polarization directions selected by the terminal-side device correspond to the same ports, P=X/2; when the two polarization directions selected by the terminal-side device correspond to the different ports, P=X; X is the number of ports configured by the network-side device for the terminal-side device; K is the number of elements in the intersection; and, the second information is indicated by a combination number with a size of $$\left\lceil \log_2 \binom{P-K}{K_{l,1}-K} \right\rceil$$

bits; or, the second information is indicated by a bitmap with a size of P−K bits;

when the two polarization directions selected by the terminal-side device correspond to the same ports, $$K_{l,1} = \frac{P'_l}{2};$$

when the two polarization directions selected by the terminal-side device correspond to the different ports, $K_{l,1}=P_l'$; $P_l'$ is the number of ports selected by the terminal-side device for l-th transmission layer.

4. The codebook indication method of claim 1, wherein the codebook indication information further comprises frequency domain basis vector indication information of the at least one transmission layer; wherein for l-th transmission layer, the frequency domain basis vector indication information comprises $$\left\lceil \log_2 \binom{2N-1}{M_l - 1} \right\rceil$$

bits, wherein N is a number of frequency domain basis vectors configured by the network-side device for the terminal-side device, and $M_l$ is a number of frequency domain basis vectors selected by the terminal-side device; or, for l-th transmission layer, the frequency domain basis vector indication information is indicated by a bitmap of size 2N−1 bits, wherein N is a number of frequency domain basis vectors configured by the network-side device for the terminal-side device; or, for l-th transmission layer, the frequency domain basis vector indication information comprises $$\left\lceil \log_2 \binom{N-1}{M_l - 1} \right\rceil$$

bits of information and $\lceil \log_2 N \rceil$ bits of information, the $\lceil \log_2 N \rceil$ bits of information being used to indicate a frequency domain basis vector corresponding to a strongest coefficient, wherein N is a number of frequency domain basis vectors configured by the network-side device for the terminal-side device, and $M_l$ is a number of frequency domain basis vectors selected by the terminal-side device; or, for l-th transmission layer, the frequency domain basis vector indication information is indicated by a bitmap with a size of N−1 bits and $\lceil \log_2 N \rceil$ bits of information, the $\lceil \log_2 N \rceil$ bits of information being used to indicate a frequency domain basis vector corresponding to a strongest coefficient, wherein N is a number of frequency domain basis vectors configured by the network-side device for the terminal-side device; or, for l-th transmission layer, the frequency domain basis vector indication information comprises $$\left\lceil \log_2 \binom{N}{M_l} \right\rceil$$

bits, wherein N is a number of frequency domain basis vectors configured by the network-side device for the terminal-side device, and $M_l$ is a number of frequency domain basis vectors selected by the terminal-side device; or, for l-th transmission layer, the frequency domain basis vector indication information is indicated by a bitmap with a size of N bits, wherein N is a number of frequency domain basis vectors configured by the network-side device for the terminal-side device.

5. The codebook indication method of claim 4, wherein the frequency domain basis vector indication information comprises third information and fourth information;

the third information is used to indicate an intersection of frequency domain basis vectors corresponding to each transmission layer; and the fourth information is used to indicate remaining frequency domain basis vectors other than the intersection among frequency domain basis vectors corresponding to each transmission layer; or, the third information is used to indicate a union of frequency domain basis vectors corresponding to each transmission layer; and the fourth information is used to indicate the frequency domain basis vectors corresponding to each transmission layer.

6. A codebook indication apparatus, the apparatus comprising: a memory; a transceiver; and a processor;

the memory, used to store computer programs; the transceiver, used to transmit and receive data under control of the processor; and the processor, used to read the computer programs in the memory and perform:

transmitting codebook indication information to a network-side device, the codebook indication information comprising strongest coefficient indication information of at least one transmission layer;

wherein for l-th transmission layer, the strongest coefficient indication information comprises $\lceil \log_2 K_{l,0} \rceil$ bits of information, the $\lceil \log_2 K_{l,0} \rceil$ bits of information being used to indicate a target strongest coefficient in non-zero coefficients for the l-th transmission layer, wherein $K_{l,0}$ is a number of non-zero coefficients selected by a terminal-side device; or, for l-th transmission layer, the strongest coefficient indication information comprises $\lceil \log_2 M_l \rceil$ bits of information and $\lceil \log_2 K_{l,1} \rceil$ bits of information, the $\lceil \log_2 M_l \rceil$ bits of information and the $\lceil \log_2 K_{l,1} \rceil$ bits of information being used to jointly indicate a target strongest coefficient for the l-th transmission layer in non-zero coefficients, wherein $K_{l,1}$ is a number of ports selected by a terminal-side device, $\lceil \log_2 M_l \rceil$ is used to indicate a frequency domain basis vector corresponding to the target strongest coefficient, and $M_l$ is a number of frequency domain basis vectors selected by the terminal-side device; or, for l-th transmission layer, the strongest coefficient indication information comprises $\lceil \log_2 K_{l,1} \rceil$ bits of information, the $\lceil \log_2 K_{l,1} \rceil$ bits of information being used to indicate a target strongest coefficient for the l-th transmission layer in non-zero coefficients, wherein $K_{l,1}$ is a number of ports selected by a terminal-side device.

7. The codebook indication apparatus of claim 6, wherein the codebook indication information further comprises port se indication information of the at least one transmission layer and wherein the port selection indication information comprises first information and second information;

when two polarization directions selected by the terminal-side device correspond to same ports, the first information is used to indicate an intersection of ports corresponding to each transmission layer in one polarization direction; and the second information is used to indicate remaining ports other than the intersection among ports corresponding to each transmission layer in one polarization direction; or, when two polarization directions selected by the terminal-side device correspond to different ports, the first information is used to indicate an intersection of ports corresponding to each transmission layer in the two polarization directions; and the second information is used to indicate remaining ports other than the intersection among ports corresponding to each transmission layer in the two polarization directions.

8. The codebook indication apparatus of claim 7, wherein the first information is indicated by a combination number with a size of $$\left\lceil \log_2 \binom{P}{K} \right\rceil$$

bits; or, the first information is indicated by a bitmap with a size of P bits;

when the two polarization directions selected by the terminal-side device correspond to the same ports, P=X/2; when the two polarization directions selected by the terminal-side device correspond to the different ports, P=X; X is the number of ports configured by the network-side device for the terminal-side device; K is the number of elements in the intersection;

and, the second information is indicated by a combination number with a size of $$\left\lceil \log_2 \binom{P-K}{K_{l,1}-K} \right\rceil$$

bits; or, the second information is indicated by a bitmap with a size of P−K bits;

when the two polarization directions selected by the terminal-side device correspond to the same ports, $$K_{l,1} = \frac{P'_l}{2};$$

when the two polarization directions selected by the terminal-side device correspond to the different ports, $K_{l,1}=P_l'$; $P_l'$ is the number of ports selected by the terminal-side device for l-th transmission layer.

9. The codebook indication apparatus of claim 6, wherein the codebook indication information further comprises frequency domain basis vector indication information of the at least one transmission layer; wherein for l-th transmission layer, the frequency domain basis vector indication information comprises $$\left\lceil \log_2 \binom{2N-1}{M_l-1} \right\rceil$$

bits, wherein N is a number of frequency domain basis vectors configured by the network-side device for the terminal-side device, and $M_l$ is a number of frequency domain basis vectors selected by the terminal-side device; or, for l-th transmission layer, the frequency domain basis vector indication information is indicated by a bitmap of size 2N−1 bits, wherein N is a number of frequency domain basis vectors configured by the network-side device for the terminal-side device; or, for l-th transmission layer, the frequency domain basis vector indication information comprises $$\left\lceil \log_2 \binom{N-1}{M_l-1} \right\rceil$$

bits of information and $\lceil \log_2 N \rceil$ bits of information, the $\lceil \log_2 N \rceil$ bits of information being used to indicate a frequency domain basis vector corresponding to a strongest coefficient, wherein N is a number of frequency domain basis vectors configured by the network-side device for the terminal-side device, and $M_l$ is a number of frequency domain basis vectors selected by the terminal-side device; or, for l-th transmission layer, the frequency domain basis vector indication information is indicated by a bitmap with a size of N−1 bits and $\lceil \log_2 N \rceil$ bits of information, the $\lceil \log_2 N \rceil$ bits of information being used to indicate a frequency domain basis vector corresponding to a strongest coefficient, wherein N is a number of frequency domain basis vectors configured by the network-side device for the terminal-side device; or, for l-th transmission layer, the frequency domain basis vector indication information comprises $$\left\lceil \log_2 \binom{N}{M_l} \right\rceil$$

bits, wherein N is a number of frequency domain basis vectors configured by the network-side device for the terminal-side device, and $M_l$ is a number of frequency domain basis vectors selected by the terminal-side device; or, for l-th transmission layer, the frequency domain basis vector indication information is indicated by a bitmap with a size of N bits, wherein N is a number of frequency domain basis vectors configured by the network-side device for the terminal-side device.

10. The codebook indication apparatus of claim 9, wherein the frequency domain basis vector indication information comprises third information and fourth information;

the third information is used to indicate an intersection of frequency domain basis vectors corresponding to each transmission layer; and the fourth information is used to indicate remaining frequency domain basis vectors other than the intersection among frequency domain basis vectors corresponding to each transmission layer; or, the third information is used to indicate a union of frequency domain basis vectors corresponding to each transmission layer; and the fourth information is used to indicate the frequency domain basis vectors corresponding to each transmission layer.

11. A non-transitory processor-readable storage medium, storing a computer program, wherein the computer program, when executed by a processor, causes the processor to perform:

transmitting codebook indication information to a network-side device, the codebook indication information comprising strongest coefficient indication information of at least one transmission layer;

wherein for l-th transmission layer, the strongest coefficient indication information comprises $\lceil \log_2 K_{l,0} \rceil$ bits of information, the $\lceil \log_2 K_{l,0} \rceil$ bits of information being used to indicate a target strongest coefficient in non-zero coefficients for the l-th transmission layer, wherein $K_{l,0}$ is a number of non-zero coefficients selected by a terminal-side device; or, for l-th transmission layer, the strongest coefficient indication information comprises $\lceil \log_2 M_l \rceil$ bits of information and $\lceil \log_2 K_{l,1} \rceil$ bits of information, the $\lceil \log_2 M_l \rceil$ bits of information and the $\log_2 K_{l,1}$ bits of information being used to jointly indicate a target strongest coefficient for the l-th transmission layer in non-zero coefficients, wherein $K_{l,1}$ is a number of ports selected by a terminal-side device, $\lceil \log_2 M_l \rceil$ is used to indicate a frequency domain basis vector corresponding to the target strongest coefficient, and $M_l$ is a number of frequency domain basis vectors selected by the terminal-side device; or, for l-th transmission layer, the strongest coefficient indication information comprises $\lceil \log_2 K_{l,1} \rceil$ bits of information, the $\lceil \log_2 K_{l,1} \rceil$ bits of information being used to indicate a target strongest coefficient for the l-th transmission layer in non-zero coefficients, wherein $K_{l,1}$ is a number of ports selected by a terminal-side device.

12. The non-transitory processor-readable storage medium of claim 11, wherein the codebook indication information further comprises frequency domain basis vector indication information of the at least one transmission layer; wherein for l-th transmission layer, the frequency domain basis vector indication information comprises $$\left\lceil \log_2 \binom{2N-1}{M_l-1} \right\rceil$$

bits, wherein N is a number of frequency domain basis vectors configured by the network-side device for the terminal-side device, and $M_l$ is a number of frequency domain basis vectors selected by the terminal-side device; or, for l-th transmission layer, the frequency domain basis vector indication information is indicated by a bitmap of size 2N−1 bits, wherein N is a number of frequency domain basis vectors configured by the network-side device for the terminal-side device; or, for l-th transmission layer, the frequency domain basis vector indication information comprises $$\left\lceil \log_2 \binom{N-1}{M_l-1} \right\rceil$$

bits of information and $\lceil \log_2 N \rceil$ bits of information, the $\lceil \log_2 N \rceil$ bits of information being used to indicate a frequency domain basis vector corresponding to a strongest coefficient, wherein N is a number of frequency domain basis vectors configured by the network-side device for the terminal-side device, and $M_l$ is a number of frequency domain basis vectors selected by the terminal-side device; or, for l-th transmission layer, the frequency domain basis vector indication information is indicated by a bitmap with a size of N−1 bits and $\lceil \log_2 N \rceil$ bits of information, the $\lceil \log_2 N \rceil$ bits of information being used to indicate a frequency domain basis vector corresponding to a strongest coefficient, wherein N is a number of frequency domain basis vectors configured by the network-side device for the terminal-side device; or, for l-th transmission layer, the frequency domain basis vector indication information comprises $$\left\lceil \log_2 \binom{N}{M_l} \right\rceil$$

bits, wherein N is a number of frequency domain basis vectors configured by the network-side device for the terminal-side device, and $M_l$ is a number of frequency domain basis vectors selected by the terminal-side device; or, for l-th transmission layer, the frequency domain basis vector indication information is indicated by a bitmap with a size of N bits, wherein N is a number of frequency domain basis vectors configured by the network-side device for the terminal-side device.

\* \* \* \* \*